United States Patent
Suzuki et al.

(10) Patent No.: US 10,927,226 B2
(45) Date of Patent: Feb. 23, 2021

(54) PREPREG AND METHOD FOR PRODUCING SAME

(71) Applicant: TOHO TENAX CO., LTD., Tokyo (JP)

(72) Inventors: Takaya Suzuki, Shizuoka (JP); Hajime Sakamoto, Shizuoka (JP); Toyoaki Ishiwata, Shizuoka (JP); Yoshitaka Umemoto, Shizuoka (JP)

(73) Assignee: TOHO TENAX CO., LTD., Tokyo (JP)

( * ) Notice: Subject to any disclaimer, the term of this patent is extended or adjusted under 35 U.S.C. 154(b) by 388 days.

(21) Appl. No.: 14/431,079

(22) PCT Filed: Sep. 25, 2013

(86) PCT No.: PCT/JP2013/075922
§ 371 (c)(1),
(2) Date: Mar. 25, 2015

(87) PCT Pub. No.: WO2014/050896
PCT Pub. Date: Apr. 3, 2014

(65) Prior Publication Data
US 2015/0274911 A1  Oct. 1, 2015

(30) Foreign Application Priority Data

Sep. 26, 2012 (JP) ............... JP2012-212934
Sep. 26, 2012 (JP) ............... JP2012-212939
Sep. 26, 2012 (JP) ............... JP2012-212949
Aug. 12, 2013 (JP) ............... JP2013-167899
Aug. 12, 2013 (JP) ............... JP2013-167900

(51) Int. Cl.
| | |
|---|---|
| *B32B 5/26* | (2006.01) |
| *B32B 7/06* | (2019.01) |
| *B32B 27/08* | (2006.01) |
| *B32B 37/10* | (2006.01) |
| *B32B 27/38* | (2006.01) |
| *B29B 11/16* | (2006.01) |
| *C08J 5/24* | (2006.01) |
| *B29K 63/00* | (2006.01) |
| *B29K 105/08* | (2006.01) |
| *B29K 307/04* | (2006.01) |

(52) U.S. Cl.
CPC .............. *C08J 5/24* (2013.01); *B29B 11/16* (2013.01); *B32B 5/26* (2013.01); *B32B 7/06* (2013.01); *B32B 27/08* (2013.01); *B32B 27/38* (2013.01); *B32B 37/10* (2013.01); *B29K 2063/00* (2013.01); *B29K 2105/089* (2013.01); *B29K 2307/04* (2013.01); *B29K 2995/0005* (2013.01); *B32B 2250/24* (2013.01); *B32B 2260/023* (2013.01); *B32B 2260/046* (2013.01); *B32B 2262/106* (2013.01); *B32B 2264/105* (2013.01); *B32B 2264/108* (2013.01); *B32B 2307/202* (2013.01); *B32B 2307/558* (2013.01); *B32B 2307/702* (2013.01); *B32B 2307/748* (2013.01); *B32B 2605/00* (2013.01); *C08J 2363/00* (2013.01); *C08J 2377/00* (2013.01); *C08J 2381/06* (2013.01); *Y10T 156/10* (2015.01); *Y10T 428/31515* (2015.04)

(58) Field of Classification Search
None
See application file for complete search history.

(56) References Cited

U.S. PATENT DOCUMENTS

| | | | | |
|---|---|---|---|---|
| 2006/0211280 A1* | 9/2006 | Igarashi | ............... | G01R 1/0735 439/91 |
| 2007/0197684 A1* | 8/2007 | Yamashita | ............. | C09D 11/40 523/160 |
| 2010/0028616 A1* | 2/2010 | Yamanouchi | ......... | B29C 43/003 428/172 |
| 2010/0178487 A1 | 7/2010 | Arai et al. | | |
| 2010/0247149 A1* | 9/2010 | Hoshio | ............... | G03G 15/0233 399/176 |
| 2011/0147674 A1 | 6/2011 | Arai et al. | | |
| 2011/0151235 A1 | 6/2011 | Arai et al. | | |

(Continued)

FOREIGN PATENT DOCUMENTS

| | | | |
|---|---|---|---|
| EP | 1072634 A1 * | 7/1999 | |
| EP | 2 687 557 A1 | 1/2014 | |

(Continued)

OTHER PUBLICATIONS

Glossary of Terms in Composites. Retrieved on Feb. 21, 2019. https://www.fibreglast.com/product/glossary-of-terms-in-composites/Learning_Center (Year: 2019).*
International Search Report dated Dec. 12, 2013, dated Dec. 24, 2013.
English Translation of International Search Report dated Dec. 12, 2013, dated Dec. 24, 2013.
HexPly M21 Product Data, 2015.

*Primary Examiner* — Sheeba Ahmed
(74) *Attorney, Agent, or Firm* — Norris McLaughlin, P.A.

(57) ABSTRACT

The invention provides a prepreg comprising: a primary prepreg composed of reinforcing fibers and a resin composition (I) impregnating the interior of a reinforcing fiber layer formed from these fibers; and a surface layer composed of a resin composition (II) formed on one or both sides of the primary prepreg; wherein the resin composition (I) is an epoxy resin composition [B] containing at least an epoxy resin and a thermoplastic resin, and the resin composition (II) is an epoxy resin composition [A] containing at least an epoxy resin and conductive particles.

15 Claims, 3 Drawing Sheets

(56) References Cited

U.S. PATENT DOCUMENTS

| | | | |
|---|---|---|---|
| 2011/0223420 A1* | 9/2011 | Ichiroku | C08L 71/00 428/355 EP |
| 2011/0287246 A1 | 11/2011 | Arai et al. | |
| 2011/0291056 A1 | 12/2011 | Arai et al. | |
| 2011/0313082 A1* | 12/2011 | Popp | C08G 59/50 523/443 |
| 2012/0058297 A1 | 3/2012 | Arai et al. | |
| 2012/0088864 A1* | 4/2012 | Wang | C08L 63/00 523/435 |
| 2012/0141763 A1 | 6/2012 | Cawse et al. | |
| 2012/0171477 A1 | 7/2012 | Sang et al. | |
| 2012/0214002 A1* | 8/2012 | Kasahara | C08G 59/027 428/414 |
| 2013/0344305 A1 | 12/2013 | Hatanaka et al. | |
| 2014/0154496 A1* | 6/2014 | Sang | C08J 5/24 428/313.9 |
| 2015/0141583 A1* | 5/2015 | Arai | C08L 79/02 525/397 |
| 2015/0156854 A1 | 6/2015 | Cawse et al. | |
| 2015/0368857 A1 | 12/2015 | Arai et al. | |
| 2017/0158948 A1* | 6/2017 | Kim | C09K 8/588 |
| 2017/0174893 A1* | 6/2017 | Fujita | C09C 1/0078 |
| 2019/0344338 A1* | 11/2019 | Izawa | B22F 1/0003 |

FOREIGN PATENT DOCUMENTS

| | | |
|---|---|---|
| JP | H-045057 B2 | 1/1992 |
| JP | 1994-344519 A | 12/1994 |
| JP | 1995-41575 A | 2/1995 |
| JP | 1995-41576 A | 2/1995 |
| JP | 1995-41577 A | 2/1995 |
| JP | 1996-34864 A | 2/1996 |
| JP | 1996-259713 A | 10/1996 |
| JP | 2002-020457 A | 1/2002 |
| JP | 2008-231395 A1 | 10/2008 |
| JP | 2010-508416 A | 3/2010 |
| JP | 2011-213991 A | 10/2011 |
| JP | 2012-211310 A | 11/2012 |
| WO | 2008/018421 A1 | 2/2008 |
| WO | 2011/027160 A1 | 3/2011 |
| WO | 2012/124450 A1 | 9/2012 |

* cited by examiner

PREPREG AND METHOD FOR PRODUCING SAME

This application is a 371 application of PCT/JP2013/075922 filed Sep. 25, 2013, which claims foreign priority benefits under 35 U.S.C. § 119 of Japanese Application Nos. 2012-212934 filed Sep. 26, 2012; 2012-212939 filed Sep. 26, 2012; 2012-212949 filed Sep. 26, 2012; 2013-167899 filed Aug. 12, 2013 and 2013-167900 filed Aug. 12, 2013, the disclosures of each of which are incorporated by reference herein in their entirety.

TECHNICAL FIELD

The invention relates to a prepreg capable of preparing a fiber reinforced composite material that is excellent in impact resistance and conductivity, and to a method for producing the same.

BACKGROUND ART

A carbon fiber reinforced composite material (hereinafter, abbreviated as "CFRP") composed of a carbon fiber and a resin is widely used for an aircraft, sport and leisure, and general industries due to the characteristics of lightweight, high strength, high elastic modulus, and the like. The CFRP is produced in many cases via a prepreg in which a carbon fiber and a resin are integrated in advance.

As a resin constituting a prepreg, a thermosetting resin or a thermoplastic resin is used. In particular, a prepreg using a thermosetting resin is widely used because of the tackiness, the draping property, and the high flexibility of molding. A thermosetting resin is generally low toughness, therefore, in a case where a thermosetting resin is used as a resin constituting a prepreg, there is a problem that the CFRP prepared by using the prepreg has low impact resistance. Therefore, a method for improving the impact resistance has been investigated.

In Patent Literatures 1 to 3, there is a disclosure of a prepreg in which thermoplastic resin fine particles are localized on a surface of the prepreg. These prepregs have low initial tackiness because a thermoplastic resin in a particle shape is localized on a surface of the prepreg. Further, a curing reaction with a curing agent contained in a surface layer proceeds, therefore, the storage stability is deteriorated, and the tackiness and the draping property are lowered with the lapse of time. In addition, a fiber reinforced composite material (hereinafter, abbreviated as "FRP") prepared by using a prepreg in which such a curing reaction has proceeded has many defects such as a void, and is significantly low in the mechanical properties.

In Patent Literature 4, there is a disclosure of a prepreg in which a thermoplastic resin in a particle shape, a fiber shape, or a sheet shape is distributed in the vicinity of the surface layer on one side or both sides of the prepreg. In a case where a thermoplastic resin in a particle shape or a fiber shape is used, due to the same reasons as those in Patent Literatures 1 to 3, the tackiness of the prepreg is low, and the mechanical properties of the FRP to be obtained are also low. Further, in a case where a thermoplastic resin in a sheet shape is used, the tackiness and draping property of the prepreg are lost. In addition, a defect resulting from the thermoplastic resin, such as low solvent resistance, is remarkably reflected in the FRP.

Further, in an application in the aeronautical or space field, for the protection from lightning strike, electrostatic dissipation (ESI), and electromagnetic interference (EMI), a FRP showing conductivity is required. The lightning strike to a FRP makes a hole passing through the FRP composed of a laminate of multiple plies, and may cause a catastrophic failure of the component parts.

A CFRP in which a carbon fiber is used as a reinforcing fiber is known to have some degree of conductivity, because the graphite constituting the carbon fiber has conductivity. However, the conductivity is insufficient in order to protect a CFRP from the destructive influence of lightning strike. The reason is that electric discharge by lightning strike enters between resin layers of a CFRP, evaporates the resin in the layers, causes the overall delamination, and may pass through the CFRP.

Further, a resin layer of a CFRP serves as an electrical insulator, therefore, the conductivity in the thickness direction of a CFRP (that is, in the direction perpendicular to the direction of fiber) is low. In particular, as in Patent Literatures 1 to 4, in a prepreg in which thermoplastic resin fine particles are localized in a resin layer in order to improve the impact resistance, the conductivity in the thickness direction of a CFRP is further lowered because the thermoplastic resin fine particles block the contact between the reinforcing fiber layers of the CFRP to be obtained. Therefore, it is difficult to achieve both excellent impact resistance and conductivity in a CFRP.

As a method for improving the conductivity between reinforcing fiber layers, a method for mixing metal particles into a matrix resin of a CFRP (for example, Patent Literature 5), and a method for mixing carbon particles (for example, Patent Literature 6) are considered, however, the CFRP obtained by the methods are not sufficient in the impact resistance.

CITATION LIST

Patent Literature

Patent Literature 1: 1995-41575 JP
Patent Literature 2: 1995-41576 JP
Patent Literature 3: 1995-41577 JP
Patent Literature 4: 1996-259713 JP
Patent Literature 5: 1994-344519 JP
Patent Literature 6: 1996-34864 JP

SUMMARY OF INVENTION

Technical Problem

An object of the present invention is to provide a prepreg for producing a FRP having high impact resistance, toughness between layers, and conductivity in the thickness direction, and a method for producing the same.

Solution to Problem

The present inventors prepared a prepreg by using a resin composition (I) containing at least a thermoplastic resin, and a resin composition (II) containing at least conductive particles. That is, a primary prepreg is prepared by the impregnation of a reinforcing fiber layer composed of reinforcing fibers with a resin composition (I). Further, a resin composition (II) is stacked on the surface of the primary prepreg, and integrated. It was found that the FRP prepared by using the prepreg obtained in such a way has high impact resistance and high toughness between layers, and excellent conductivity in the thickness direction, and the present invention has completed.

The present invention achieving the above-mentioned object is described in the following.

[1]

A prepreg including a primary prepreg composed of a reinforcing fiber, and a resin composition (I) with which a reinforcing fiber layer formed from the reinforcing fiber has been impregnated; and a surface layer composed of a resin composition (II) formed on one side or both sides of the primary prepreg, in which the resin composition (I) is an epoxy resin composition [B] containing at least an epoxy resin and a thermoplastic resin, and the resin composition (II) is an epoxy resin composition [A] containing at least an epoxy resin and a conductive particle.

In the present invention, the resin composition (I) with which the primary prepreg has been impregnated contains a thermoplastic resin, and the viscosity is high. Therefore, the conductive particles existed in the surface layer hardly move into the reinforcing fiber layer, and are dispersed in the surface layer of the prepreg. The prepreg of the present invention preferably contains the following constitution.

[2]

The prepreg described in [1], in which content of the conductive particle in the epoxy resin composition [A] is 0.2 to 20 parts by mass based on 100 parts by mass of the epoxy resin contained in the epoxy resin composition [A].

[3]

The prepreg described in [1], in which the conductive particle contained in the epoxy resin composition [A] is a conductive particle having an average particle diameter of less than 10 μm by a laser diffraction method.

[4]

The prepreg described in [1], in which a mass ratio of the epoxy resin contained in the epoxy resin composition [A] to the epoxy resin contained in the epoxy resin composition [B] is 1:1 to 1:9.

[5]

The prepreg described in [1], in which the thermoplastic resin contained in the epoxy resin composition [B] is an epoxy resin soluble thermoplastic resin.

[6]

The prepreg described in [1], in which the thermoplastic resin contained in the epoxy resin composition [B] is an epoxy resin-soluble thermoplastic resin and an epoxy resin-insoluble thermoplastic resin.

[7]

The prepreg described in [5] or [6], in which the epoxy resin-soluble thermoplastic resin is at least one kind selected from polyethersulfone, polyetherimide, polycarbonate, and polysulfone.

[8]

The prepreg described in [6], in which the epoxy resin-insoluble thermoplastic resin is at least one kind selected from amorphous nylon, nylon 6, nylon 12, and amorphous polyimide.

[9]

The prepreg described in [5] or [6], in which a weight average molecular weight (Mw) of the epoxy resin-soluble thermoplastic resin is 8000 to 40000.

[10]

The prepreg described in [1], in which the epoxy resin composition [B] further contains 0.2 to 20 parts by mass of conductive particle based on 100 parts by mass of the epoxy resin contained in the epoxy resin composition [B].

[11]

The prepreg described in [10], in which the conductive particle contained in the epoxy resin composition [B] is a conductive particle having an average particle diameter of 10 to 200 μm by a laser diffraction method.

[12]

The prepreg described in [1], in which at least one of the epoxy resin composition [A] and the epoxy resin composition [B] contains a curing agent for an epoxy resin.

[13]

The prepreg described in [1], in which the epoxy resin composition [B] is an epoxy resin composition containing no curing agent for an epoxy resin, and the epoxy resin composition [A] is an epoxy resin composition containing a curing agent for an epoxy resin.

[14]

The prepreg described in [1], in which the conductive particle is at least one kind selected from a carbon particle, a metal particle, a coated conductive particle, and a carbon fiber particle.

[15]

The prepreg described in [14], in which the carbon particle is at least one kind selected from a carbon black, a carbon nanotube, a carbon nanofiber, an expanded graphite, a flaky graphite, a graphite powder, a graphite particle, a graphene sheet, and a carbon milled fiber.

[16]

The prepreg described in [1], in which the reinforcing fiber is a carbon fiber.

[17]

A method for producing the prepreg described in [1], including impregnating a reinforcing fiber layer with a resin composition (I) to obtain a primary prepreg; and then stacking a sheet of a resin composition (II) on one side or both sides of the primary prepreg and thermo-compressing the primary prepreg and the sheet of a resin composition (II) to integrate.

Advantageous Effects of Invention

According to the present invention, a carbon fiber reinforced composite material having excellent conductivity and impact resistance can be obtained by the distribution of conductive particles in the vicinity of the surface of a prepreg. In a prepreg of the present invention, conductive particles contained in a resin composition in a surface layer remain in the surface layer of the prepreg without sinking in the inner layer. As a result, in the FRP to be obtained, the conductive particles serve as a conductive bridge between the reinforcing fiber layer and the adjacent reinforcing fiber layer, and maintain the electrical conductivity between the reinforcing fiber layers. According to the function, the conductivity in the thickness direction of the FRP becomes high.

Therefore, the prepreg can be applied to a number of applications that require the improvement of electromagnetic shielding, electrostatic protection, current return, and conductivity. In particular, the prepreg is suitable for the production of aerospace parts. In others, in the fields of wind turbine, building, ship, train, automobile, and other, the prepreg can be used for solving lightning problems and other electromagnetic problems.

DESCRIPTION OF EMBODIMENTS

Hereinafter, the prepreg of the present invention will be described.

1. Structure of Prepreg

A prepreg of the present invention (hereinafter, also referred to as "the present prepreg") is integrated with a primary prepreg (inner layer) composed of reinforcing fibers, and a resin composition (I) with which a reinforcing fiber layer formed from the reinforcing fibers has been impregnated; and a surface layer composed of a resin composition (II) formed on one side or both sides of the primary prepreg.

Figure 1:
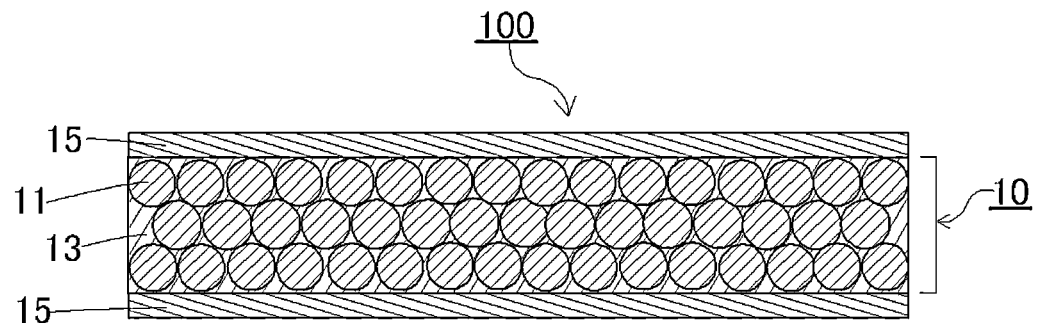
FIG. 1 is a schematic sectional drawing illustrating one example of the prepreg of the present invention.

FIG. 1 is a schematic sectional drawing illustrating one example of the present prepreg. In FIG. 1, 100 shows the present prepreg, and 10 shows a primary prepreg. A primary prepreg 10 is constituted of reinforcing fibers composed of carbon fibers 11, and a resin composition (I) 13 with which the reinforcing fiber layer has been impregnated. On the surface of the primary prepreg 10, a surface layer 15 composed of a resin composition (II) is formed by the integration with the primary prepreg 10.

In the present invention, the primary prepreg is composed of the reinforcing fibers in the center of the prepreg cross-section, and a resin composition (I) with which the reinforcing fiber layer has been impregnated. FIGS. 2(a) to 2(c) are explanatory drawings sequentially illustrating a process of producing the prepreg of the present invention (described below). The primary prepreg is expressed as a primary prepreg 10 in FIGS. 2(b) and 2(c).

(1) Reinforcing Fiber Layer

Examples of the reinforcing fiber constituting a reinforcing fiber layer of the present prepreg include a carbon fiber, a glass fiber, an aramid fiber, a silicon carbide fiber, a polyester fiber, a ceramic fiber, an alumina fiber, a boron fiber, a metal fiber, a mineral fiber, an ore fiber, and a slag fiber. Among these reinforcing fibers, a carbon fiber, a glass fiber, and an aramid fiber are preferred, and a carbon fiber by which a FRP having favorable specific strength and specific elastic modulus with lightweight and high strength is obtained is more preferred. Among the carbon fibers, a polyacrylonitrile (PAN)-based carbon fiber having excellent tensile strength is particularly preferred.

In the present invention, even if a reinforcing fiber having no conductivity is used as the reinforcing fiber, conductive particles contained in the resin composition are dispersed in the reinforcing fiber layer, therefore, a composite material having conductivity can be prepared. When a reinforcing fiber having conductivity is used, the volume resistivity of the FRP to be obtained can be largely lowered. Therefore, a reinforcing fiber having conductivity is preferably used. In a case where a reinforcing fiber having no conductivity, such as a glass fiber, and an aramid fiber, is used, it is preferable to impart conductivity to the reinforcing fiber by a method in which the surface of the reinforcing fiber is treated with metal plating, and the like.

In a case where a carbon fiber is used for a reinforcing fiber, the tensile elastic modulus is preferably 170 to 600 GPa, and particularly preferably 220 to 450 GPa. Further, the tensile strength is preferably 3920 MPa (400 kgf/mm$^2$) or more. By using such a carbon fiber, the mechanical performance of a CFRP can be improved.

The reinforcing fiber is preferably used after being formed in a sheet shape. Examples of the sheet of reinforcing fiber include a sheet-shaped product in which a large number of reinforcing fibers are arranged in parallel in one direction, a bi-directional woven fabric of plain weave, twill weave, or the like, a multi-axial woven fabric, a non-woven fabric, a mat, a knit, a braid, and a paper obtained by the papermaking from reinforcing fibers. The thickness of the sheet is preferably 0.01 to 3 mm, and more preferably 0.1 to 1.5 mm. Further, the basis weight of the sheet is preferably 70 to 400 g/m$^2$, and more preferably 100 to 300 g/m$^2$. These sheets of reinforcing fibers may contain a known sizing agent. The distance between single fibers of the sheet of reinforcing fibers is preferably less than 10 µm.

(2) Resin Composition (I) and Resin Composition (II)

In the prepreg of the present invention, the resin composition (I) forming an inner layer is composed of an epoxy resin composition [B] containing an epoxy resin and a thermoplastic resin as the essential components, and the resin composition (II) forming a surface layer is composed of an epoxy resin composition [A] containing an epoxy resin and conductive particles as the essential components.

The prepreg of the present invention has high viscosity because the resin composition (I) with which the primary prepreg has been impregnated contains a thermoplastic resin. Therefore, the conductive particles in the surface layer hardly move into the inner layer, and thus remain in the surface layer of the prepreg.

The thickness of the surface layer is preferably 2 to 30 µm, and more preferably 5 to 20 µm. In a case where the thickness is less than 2 µm, the tackiness of the prepreg to be obtained is lowered. In a case where the thickness exceeds 30 µm, the handling property of the prepreg to be obtained, and the molding precision of the FRP are easily lowered.

Further, the thickness of the primary prepreg is preferably 0.01 to 4.0 mm, and more preferably 0.1 to 2.0 mm.

The mass ratio of the epoxy resin contained in the epoxy resin composition [B] to the epoxy resin contained in the epoxy resin composition [A] is preferably 9:1 to 1:1, and more preferably 5:1 to 1:1.

The content of the reinforcing fibers of prepreg is preferably 40 to 80% by mass, and particularly preferably 50 to 70% by mass based on 100% by mass of the total mass of the prepreg. In a case where the content of the reinforcing fibers is less than 40% by mass, the strength and the like of the FRP prepared by using the prepreg are insufficient. In a case where the content of the reinforcing fibers exceeds 80% by mass, the amount of the resin with which a reinforcing fiber layer of the prepreg has been impregnated is insufficient. As a result, a void and the like are generated in the FRP prepared by using the prepreg.

(1) Epoxy Resin Composition [B]

The epoxy resin composition [B] is a resin composition containing at least an epoxy resin and a thermoplastic resin. Hereinafter, each component of the epoxy resin composition [B] will be described.

(a) Epoxy Resin

The epoxy resin mixed into the epoxy resin composition [B] is a conventionally known epoxy resin. Among them, an epoxy resin having an aromatic group in the molecule is preferably used, and a bifunctional or tri- or higher functional epoxy resin having any one of the glycidyl amine structure and glycidyl ether structure is more preferably used. Further, an alicyclic epoxy resin can also be suitably used.

Examples of the epoxy resin having a glycidyl amine structure include various isomers of N,N,N',N'-tetraglycidyldiaminodiphenylmethane, N,N,O-triglycidyl-p-aminophenol, N,N,O-triglycidyl-m-aminophenol, N,N,O-triglycidyl-3-methyl-4-aminophenol, and triglycidylaminocresol.

Examples of the epoxy resin having a glycidyl ether structure include a bisphenol A type epoxy resin, a bisphenol F type epoxy resin, a bisphenol S type epoxy resin, a phenol novolak type epoxy resin, and a cresol novolak type epoxy resin.

These epoxy resins may have a non-reactive substituent group in the aromatic ring structure and the like as needed. Examples of the non-reactive substituent group include an alkyl group such as a methyl group, an ethyl group, and an isopropyl group; an aromatic group such as a phenyl group; an alkoxyl group; an aralkyl group; and a halogen group such as chlorine, and bromine.

The epoxy resin forms a network structure by the cross-linking by a curing reaction with a curing agent. In the epoxy resin composition [B], a trifunctional epoxy resin is preferably mixed. When the trifunctional epoxy resin is mixed, the epoxy resin after curing is highly crosslinked, and the FRP has excellent properties. The trifunctional epoxy resin is preferably contained in an amount of 10% by mass or more, and more preferably contained in an amount of 20 to 75% by mass based on the amount of the epoxy resin mixed into the epoxy resin composition [B].

In order to exhibit excellent properties of the FRP after curing of prepreg, the trifunctional epoxy resin is preferably contained in an amount of 30% by mass or more, and more preferably contained in an amount of 30 to 70% by mass based on the total amount of the epoxy resin mixed into the epoxy resin compositions [A] and [B], that is, the amount of the whole epoxy resin. When the content of the trifunctional epoxy resin exceeds 70% by mass, there may be a case in which the handling property of the prepreg to be obtained is lowered.

Examples of the trifunctional epoxy resin include N,N,O-triglycidyl-p-aminophenol, and N,N,O-triglycidyl-m-aminophenol.

These epoxy resins may be used alone, or may be used in combination with two or more kinds. Further, as the epoxy resin, for example, a B-stage epoxy resin in which a preliminary reaction with a curing agent and the like has been performed in advance can also be used.

(b) Thermoplastic Resin

In the present invention, the epoxy resin composition [B] contains a thermoplastic resin. The thermoplastic resin gives appropriate viscosity to the epoxy resin composition [B], and allows the conductive particles contained in the epoxy resin composition [A] described below to remain in the vicinity of the surface of prepreg. In addition, the thermoplastic resin contained in the epoxy resin composition [B] also has an effect of improving the impact resistance of the FRP to be finally obtained.

The amount of the thermoplastic resin contained in the epoxy resin composition [B] varies depending on the kind of the epoxy resin used for the epoxy resin composition [B], and may appropriately be adjusted so that the viscosity of the epoxy resin composition [B] has an appropriate value. The thermoplastic resin is preferably mixed so as to be in an amount of 5 to 90 parts by mass, and more preferably mixed so as to be in an amount of 5 to 60 parts by mass based on 100 parts by mass of the epoxy resin contained in the epoxy resin composition [B]. In a case where the amount is less than 5 parts by mass, there may be a case in which the impact resistance of the prepreg and FRP to be obtained is insufficient. Further, in a case where the mixing amount of the thermoplastic resin is extremely large, there may be a case in which the viscosity is significantly high and the handling property of prepreg is significantly deteriorated.

The lowest viscosity of the epoxy resin composition [B] is preferably 10 poise or more, more preferably 10 to 3000 poise, further preferably 10 to 500 poise, furthermore preferably 10 to 450 poise, and particularly preferably 50 to 400 poise. When the lowest viscosity of the epoxy resin composition [B] is 10 poise or more, an effect of allowing the conductive particles contained in the epoxy resin composition [A] to remain in the vicinity of the surface of prepreg is high. As a result, the conductivity in the thickness direction of the FRP to be obtained by curing of the prepreg tends to be high. Ina case where the lowest viscosity of the epoxy resin composition [B] is extremely high, the handling property is deteriorated, for example, the viscosity of the resin composition is extremely high, and the resin impregnation property of the prepreg is lowered, therefore, the case is not preferred. Further, the viscosity at a temperature of 80° C. is preferably 50 to 2000 poise. In addition, the viscosity means the viscosity obtained from a temperature-viscosity curve measured by using a rheometer. The viscosity of the epoxy resin composition [B] can be adjusted by the addition amount of the thermoplastic resin, in particular, the epoxy resin-soluble thermoplastic resin described below.

Examples of the thermoplastic resin include an epoxy resin-soluble thermoplastic resin, and an epoxy resin-insoluble thermoplastic resin.

(b-1) Epoxy Resin-Soluble Thermoplastic Resin

The epoxy resin composition [B] contains an epoxy resin-soluble thermoplastic resin. The epoxy resin-soluble thermoplastic resin adjusts the viscosity of the epoxy resin composition [B], and further improves the impact resistance of the FRP to be obtained.

The epoxy resin-soluble thermoplastic resin means a thermoplastic resin part or all of which can be dissolved in an epoxy resin by heating or the like. On the other hand, the epoxy resin-insoluble thermoplastic resin means a thermoplastic resin that is not substantially dissolved in an epoxy resin at a temperature at which a FRP is formed, or at a temperature lower than the above. That is, the epoxy resin-insoluble thermoplastic resin means a thermoplastic resin in which when resin particles are put in an epoxy resin and the resultant is stirred, the size of the particle is unchanged at a temperature at which a FRP is formed. Further, in general, the temperature at which a FRP is formed is 100 to 190° C.

In a case of not being completely dissolved, the epoxy resin-soluble thermoplastic resin is dissolved in an epoxy resin by being heated in a curing process of the epoxy resin composition [B], and the viscosity of the epoxy resin composition [B] can be increased. Consequently, flowing (a phenomenon in which a resin composition flows out from prepreg) of the epoxy resin composition [B] due to the lowering of viscosity in a curing process can be prevented.

As the epoxy resin-soluble thermoplastic resin, a resin that is dissolved in an epoxy resin in an amount of 80% by mass or more at 190° C. is preferred.

Specific Examples of the epoxy resin-soluble thermoplastic resin include polyethersulfone, polysulfone, polyetherimide, and polycarbonate. These may be used alone, or in combination with two or more kinds. As the epoxy resin-soluble thermoplastic resin contained in the epoxy resin composition [B], polyethersulfone and polysulfone, which have a weight average molecular weight (Mw) in a range of 8000 to 40000, are particularly preferred. When the weight average molecular weight (Mw) is smaller than 8000, the impact resistance of the FRP to be obtained is insufficient, and when the Mw is larger than 40000, there may be a case in which the viscosity is significantly high and the handling property is significantly deteriorated. The molecular weight distribution of the epoxy resin-soluble thermoplastic resin is preferably uniform. In particular, the polydispersity (Mw/Mn) that is a ratio of weight average molecular weight (Mw) to number average molecular weight (Mn) is preferably in a range of 1 to 10, and more preferably in a range of 1.1 to 5.

The epoxy resin-soluble thermoplastic resin preferably has a reactive group having a reactivity with an epoxy resin, or a functional group forming a hydrogen bond. Such an epoxy resin-soluble thermoplastic resin can improve the dissolution stability in a curing process of an epoxy resin. Further, toughness, chemical resistance, heat resistance, and moist heat resistance can be imparted to the FRP to be obtained after curing.

As the reactive group having a reactivity with an epoxy resin, a hydroxyl group, a carboxylic acid group, an imino group, an amino group, and the like are preferred. When hydroxyl group-terminated polyethersulfone is used, the impact resistance, fracture toughness, and solvent resistance of the FRP to be obtained are particularly excellent, therefore, the use is more preferred.

The content of the epoxy resin-soluble thermoplastic resin contained in the epoxy resin composition [B] is appropriately adjusted depending on the viscosity of the primary prepreg. From the viewpoint of the processability of primary prepreg, the content is preferably 5 to 90 parts by mass, more preferably 5 to 50 parts by mass, and further preferably 10 to 40 parts by mass based on 100 parts by mass of the epoxy resin contained in the epoxy resin composition [B]. In a case where the content is less than 5 parts by mass, there may be a case in which the impact resistance of the FRP to be obtained is insufficient. When the content of the epoxy resin-soluble thermoplastic resin becomes high, there may be a case in which the viscosity is significantly high and the handling property of prepreg is significantly deteriorated.

The content of the epoxy resin-soluble thermoplastic resin is preferably 5 to 90 parts by mass, more preferably 5 to 40 parts by mass, and further preferably 15 to 35 parts by mass based on 100 parts by mass of the whole epoxy resin contained in the epoxy resin composition [A] and epoxy resin composition [B]. In a case where the content is less than 5 parts by mass, there may be a case in which the impact resistance of the FRP to be obtained is insufficient. When the content of the epoxy resin-soluble thermoplastic resin becomes high, there may be a case in which the viscosity is significantly high and the handling property of prepreg is significantly deteriorated.

In the epoxy resin-soluble thermoplastic resin, a reactive aromatic oligomer having an amine terminal group (hereinafter, also simply referred to as "aromatic oligomer") is preferably contained.

The molecular weight of the epoxy resin composition is increased by a curing reaction of an epoxy resin with a curing agent during the heat curing. According to the expansion of two-phase region by the increase of molecular weight, the aromatic oligomer dissolved in the epoxy resin composition causes reaction-inducing phase separation. According to the phase separation, a two-phase structure of a resin in which an epoxy resin after curing and an aromatic oligomer are co-continuous is formed in a matrix resin. Further, the aromatic oligomer has an amine terminal group, therefore, a reaction with an epoxy resin is generated. Each phase in the co-continuous two-phase structure is strongly bonded to each other, therefore, the solvent resistance is also improved.

Figure 6:
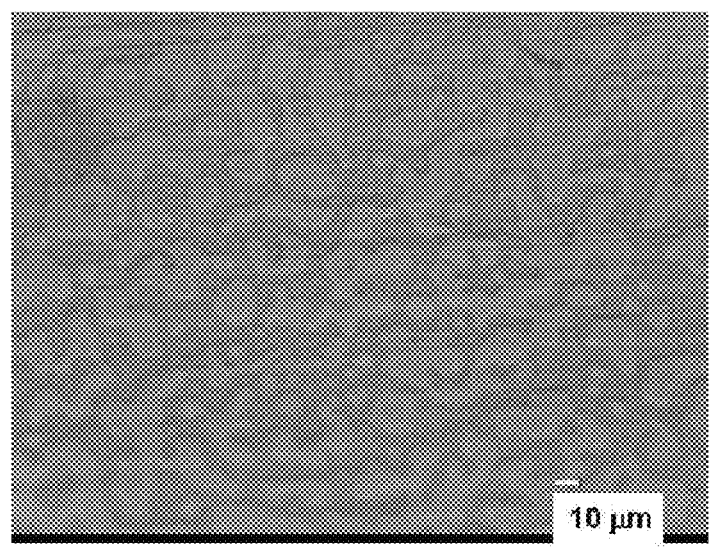
FIG. 6 is a picture substituting for the drawing of the cross-section of the resin cured material prepared by the kneading of an epoxy resin, a curing agent, and a reactive oligomer having an amine terminal group.

FIG. 6 is a picture substituting for the drawing of the cross-section of the cured material of the resin composition prepared by the kneading of an epoxy resin, a curing agent, and a reactive oligomer having an amine terminal group. The resin composition is composed of (a) component: an epoxy resin in an amount of 100 parts by mass (MY0600), (b) component: a curing agent in an amount of 50 parts by mass (3,3-DDS), and (c) component: a reactive oligomer having an amine terminal group in an amount of 60 parts by mass (DAMS VW-30500RP).

The co-continuous structure absorbs the impact on the FRP from the outside to suppress crack propagation. As a result, the FRP prepared by using a prepreg that contains a reactive aromatic oligomer having an amine terminal group has high impact resistance and fracture toughness.

As the aromatic oligomer, known polysulfone having an amine terminal group, and polyethersulfone having an amine terminal group can be used. The amine terminal group is preferably a primary amine (—NH$_2$) terminal group.

In the aromatic oligomer mixed into the epoxy resin composition [B], the weight average molecular weight is preferably 8000 to 40000. In a case where the weight average molecular weight is less than 8000, the toughness improving effect of the matrix resin is low. Further, in a case where the weight average molecular weight exceeds 40000, the viscosity of the resin composition is extremely high, and a problem in the processing, that is for example, a reinforcing fiber layer is hardly impregnated with a resin composition, is easily generated.

As the aromatic oligomer, a commercial product such as "Virantage DAMS VW-30500 RP (registered trademark)" (manufactured by Solvay Specialty Polymers) can preferably be used.

In order to form a two-phase structure of a resin that is co-continuous in a matrix resin, the mixing amount of the aromatic oligomer in the epoxy resin composition [B] is preferably 30 to 90 parts by mass, more preferably 40 to 80 parts by mass, and particularly preferably 45 to 65 parts by mass based on 100 parts by mass of the epoxy resin contained in the epoxy resin composition [B]. In a case where the mixing amount is 30 parts by mass or more, the co-continuous two-phase structure formed of an aromatic oligomer can efficiently absorb the impact on the FRP. Therefore, the impact resistance of the FRP to be obtained becomes high. If the mixing amount is 90 parts by mass or less, the viscosity of the epoxy resin composition [B] is not extremely high, and there is no adverse effect on the handling property in the production process of the epoxy resin composition [B] or the production process of the prepreg. In the FRP in which a co-continuous two-phase structure formed of an aromatic oligomer in the predetermined amount described above is uniformly formed in a matrix resin, the crack propagation against impact is suppressed. Therefore, the impact resistance of the FRP to be obtained becomes high. Further, in a case where the two-phase structure of a resin that is co-continuous is not allowed to be formed in a matrix resin, the content of the epoxy resin-soluble thermoplastic resin contained in the epoxy resin composition [B] is, from the viewpoint of the processability of a primary prepreg, preferably 5 to 50 parts by mass, and more preferably 10 to 40 parts by mass based on 100 parts by mass of the epoxy resin contained in the epoxy resin composition [B].

The form of the epoxy resin-soluble thermoplastic resin is not particularly limited, however, preferably in a particle shape. The epoxy resin-soluble thermoplastic resin in a particle shape can uniformly be mixed into a resin composition. Further, the moldability of the prepreg to be obtained is high.

The average particle diameter of the epoxy resin-soluble thermoplastic resin is preferably 1 to 50 µm, and particularly preferably 3 to 30 µm. In a case where the average particle diameter is less than 1 µm, the viscosity of the epoxy resin composition is significantly increased. Therefore, there may be a case in which the epoxy resin-soluble thermoplastic resin in a sufficient amount becomes difficult to be added into an epoxy resin composition. In a case where the average particle diameter exceeds 50 µm, there may be a case in which when the epoxy resin composition is processed into a sheet shape, a sheet having a uniform thickness is hardly obtained. Further, the rate of dissolution to an epoxy resin becomes slow, and the FRP to be obtained becomes uneven, therefore, this case is not preferred.

(b-2) Epoxy Resin-Insoluble Thermoplastic Resin

In the epoxy resin composition [B], an epoxy resin-insoluble thermoplastic resin may be contained in addition to the epoxy resin-soluble thermoplastic resin. In the present invention, the epoxy resin composition [B] preferably contains both of the epoxy resin-soluble thermoplastic resin and the epoxy resin-insoluble thermoplastic resin.

The epoxy resin-insoluble thermoplastic resin or the part of epoxy resin-soluble thermoplastic resin (the epoxy resin-soluble thermoplastic resin remained without being dissolved in a matrix resin after curing) is turned into a state in which the particles are dispersed in a matrix resin of the FRP (hereinafter, the dispersed particles are also referred to as "interlayer particles"). The interlayer particles suppress the propagation of the impact given to the FRP. As a result, the impact resistance of the FRP to be obtained is improved.

Examples of the epoxy resin-insoluble thermoplastic resin include polyamide, polyacetal, polyphenylene oxide, polyphenylene sulfide, polyester, polyamideimide, polyimide, polyether ketone, polyether ether ketone, polyethylene naphthalate, polyether nitrile, and polybenzimidazole. Among them, polyamide, polyamideimide, and polyimide have high toughness and heat resistance, therefore are preferred. Polyamide and polyimide are particularly excellent in the toughness improving effect for the FRP. These may be used alone, or in combination with two or more kinds. Further, a copolymer of these compounds may also be used.

In particular, by using amorphous polyimide, and a polyamide such as nylon 6 (registered trademark) (polyamide obtained by ring-opening polycondensation of caprolactam), nylon 12 (polyamide obtained by ring-opening polycondensation of lauryllactam), and amorphous nylon (also called transparent nylon, and being nylon which causes no polymer crystallization or is extremely slow in polymer crystallization rate), the heat resistance of the FRP to be obtained can particularly be improved.

The content of the epoxy resin-insoluble thermoplastic resin in the epoxy resin composition [B] is appropriately adjusted depending on the viscosity of the epoxy resin composition [B]. From the viewpoint of the processability of prepreg, the content is preferably 5 to 60 parts by mass, and more preferably 15 to 40 parts by mass based on 100 parts by mass of the epoxy resin contained in the epoxy resin composition [B]. In a case where the content is less than 5 parts by mass, there may be a case in which the impact resistance of the FRP to be obtained is insufficient. In a case where the content exceeds 60 parts by mass, there may be a case in which the impregnating property of the epoxy resin composition [B], the draping property of the prepreg to be obtained, and the like are lowered.

Further, the content of the epoxy resin-insoluble thermoplastic resin is preferably 10 to 45 parts by mass, and more preferably 20 to 45 parts by mass based on 100 parts by mass of the whole epoxy resin contained in the epoxy resin compositions [A] and [B]. In a case where the content is less than 10 parts by mass, there may be a case in which the impact resistance of the FRP to be obtained is insufficient. In a case where the content exceeds 45 parts by mass, there may be a case in which the impregnating property of the epoxy resin composition [B], the draping property of the prepreg, and the like are lowered.

The preferred average particle diameter and form of the epoxy resin-insoluble thermoplastic resin are the same as those of the epoxy resin-soluble thermoplastic resin.

(c) Curing Agent

A curing agent to cure the epoxy resin is mixed into the epoxy resin compositions [A] and/or [B], as needed. As the curing agent mixed into the epoxy resin compositions [A] and/or [B], a known curing agent that cures the epoxy resin mixed into the epoxy resin compositions [A] and [B] is used. For example, examples of the curing agent include dicyandiamide, various isomers of an aromatic amine-based curing agent, and aminobenzoic acid esters. Dicyandiamide is excellent in the storage stability of a prepreg, therefore preferred. Further, an aromatic diamine compound such as 4,4'-diaminodiphenylsulfone, 3,3'-diaminodiphenylsulfone, and 4,4'-diaminodiphenylmethane, and a derivative thereof having a non-reactive substituent group are particularly preferred from the viewpoint of giving a cured material having high heat resistance. The non-reactive substituent group is as described in the above (a) Epoxy resin.

As the aminobenzoic acid esters, trimethylene glycol di-p-aminobenzoate, and neopentylglycol di-p-aminobenzoate are preferably used. The FRP cured by using these curing agents is lower in the heat resistance, however, higher in the tensile elongation, as compared with a FRP cured by using various isomers of diaminodiphenylsulfone. Therefore, the curing agent is appropriately selected depending on the application of the FRP.

The total amount of the curing agent mixed into the epoxy resin compositions [A] and [B] is an amount adequate for curing the whole epoxy resin mixed into the epoxy resin compositions [A] and [B]. The amount is appropriately adjusted depending on the kinds of the epoxy resin and curing agent used. From the viewpoint of the storage stability, the amount is preferably 30 to 100 parts by mass, and more preferably 30 to 70 parts by mass based on 100 parts by mass of the whole epoxy resin. Further, in a case where a curing agent is not contained in one of the epoxy resin compositions [A] and [B], the amount of the curing agent mixed into the other epoxy resin composition is an amount adequate for curing the whole epoxy resin. For example, in a case where the aromatic diamine compound is used as a curing agent, the amount is preferably 25 to 55 parts by mass based on 100 parts by mass of the whole epoxy resin.

(d) Conductive Particle

The epoxy resin composition [B] may contain conductive particles as needed. As the conductive particles, the same ones as the conductive particles described below can be used. The conductive particles contained in the epoxy resin composition [B] are preferably 0.2 to 20 parts by mass, more preferably 1 to 15 parts by mass, and particularly preferably 5 to 15 parts by mass based on 100 parts by mass of the epoxy resin contained in the epoxy resin composition [B]. In a case where the content is less than 0.2 part by mass, the conductivity in the thickness direction of the FRP to be obtained is hardly improved. Further, in a case where the content exceeds 20 parts by mass, there may be a case in which the viscosity of the resin composition is significantly high and the handling property is deteriorated.

In order to improve the conductivity of the FRP to be obtained by curing, the epoxy resin composition [B] preferably contains conductive particles having an average particle diameter of 10 to 200 μm, and more preferably contains conductive particles having an average particle diameter of 50 to 200 μm by a laser diffraction method. Further, conductive particles having an average particle diameter of 5 μm or less are also preferably contained. In particular, two different kinds of conductive particles composed of conductive particles having an average particle diameter of 10 to 200 μm and conductive particles having an average particle diameter of 5 μm or less are preferably contained.

In the FRP to be obtained by the curing of the prepreg, the conductive particles connect the reinforcing fiber layers with each other in the thickness direction, and serve as a conductive bridge in the thickness direction of the FRP, as a result, the conductivity in the thickness direction is improved.

The shape of the conductive particles may be a shape of a spherical particle, a non-spherical particle, or a porous particle, however, is preferably a shape of sphere from the viewpoint of the uniform impartation of the conductivity.

If the particle diameter of the conductive particle is 10 μm or more, the particle diameter is larger than the distance between single fibers of the reinforcing fiber layer, therefore, the conductive particle hardly enters the reinforcing fiber layer. Therefore, when the reinforcing fiber layer is impregnated with the epoxy resin composition [B], the conductive particles remain on the surface of the reinforcing fiber layer, and are easily exposed. As a result, the reinforcing fiber layers of each prepreg are electrically connected with each other by conductive particles. That is, the conductive particles easily remain in a resin layer (between a reinforcing fiber layer and a reinforcing fiber layer) of the FRP, form a conductive bridge to connect the reinforcing fiber layers that are adjacent to each other in the thickness direction, and easily improve the conductivity.

In a case where the particle diameter of the conductive particle is larger than 200 μm, there may be a case in which when the resin composition to be obtained is processed into the sheet shape described below, a sheet having a uniform thickness is hardly prepared.

On the other hand, when conductive particles having an average particle diameter of 5 μm or less are used, the conductive particles are dispersed in both of the reinforcing fiber layer and the resin layer, and the conductivity of the FRP to be obtained is further easily improved, therefore, the conductive particles are preferred. The average particle diameter is preferably 1 μm or less, and more preferably 0.5 μm or less.

(e) Other Components

Into the epoxy resin composition [B], other components may be contained as long as the object and effect of the present invention are not impaired. Examples of the other components include various additives such as an amine compound such as tertiary amine, and imidazole; a phosphorus compound such as phosphines, and phosphonium; a curing accelerator such as a N,N-dimethyl urea derivative; a reactive diluent; a filling material; an antioxidant; a flame retardant; and a pigment. Of which the amounts are known.

(2) Epoxy Resin Composition [A]

The epoxy resin composition [A] is a resin composition containing at least an epoxy resin and conductive particles. Hereinafter, each component of the epoxy resin composition [A] will be described.

(f) Epoxy Resin

Examples of the epoxy resin mixed into the epoxy resin composition [A] include a conventionally known epoxy resin explained in the epoxy resin composition [B]. In order to favorably bond to the primary prepreg, the epoxy resin mixed into the epoxy resin composition [A] is preferably the same epoxy resin as that mixed into the epoxy resin composition [B].

(g) Conductive Particle

Into the epoxy resin composition [A], conductive particles are mixed in order to impart the conductivity to the FRP to be obtained by the curing of the prepreg. The conductive particles serve as a conductive bridge in the thickness direction in the FRP to be obtained by the curing of the prepreg, as a result, the reinforcing fiber layers that are adjacent to each other are connected with each other, and the conductivity in the thickness direction is increased. At this time, a large majority of conductive particles are desirably in the surface layer of the FRP.

The conductive particle used in the present invention may be a particle acting as an electrically favorable conductor, and is not limited to the particle composed of only a conductor. The conductive particle is a particle having a volume resistivity of preferably 10 to $10^{-9}$ Ωcm, more preferably 1 to $10^{-9}$ Ωcm, and particularly preferably $10^{-1}$ to $10^{-9}$ Ωcm. When the volume resistivity is extremely high, there may be a case in which sufficient conductivity is not obtained in the FRP.

Examples of the conductive particle include a conductive polymer particle such as a polyacetylene particle, a polyaniline particle, a polypyrrole particle, a polythiophene particle, a polyisothianaphthene particle, and a polyethylenedioxythiophene particle; a carbon particle; a carbon fiber particle; a metal particle; and a particle of which a core material composed of an inorganic material or an organic material is coated with a conductive substance. Among them, in view of exhibiting a high conductivity and stability, a carbon particle, a metal particle, and a particle of which a core material composed of an inorganic material or an organic material is coated with a conductive substance are preferred.

Examples of the carbon particle include a carbon black, an expanded graphite, a flaky graphite, a graphite powder, a graphite particle, a graphene sheet, a carbon milled fiber, a carbon nanotube, and a carbon nanofiber containing vapor grown carbon fiber (VGCF, registered trademark). Among them, in view of exhibiting a high conductivity and being inexpensive, a carbon black, and a carbon milled fiber are preferred. Examples of the carbon black include a furnace black, an acetylene black, a thermal black, a channel black, and Ketjen black (registered trademark). Examples of the carbon milled fiber include a milled fiber of a PAN-based carbon fiber, a pitch-based carbon fiber, or a phenol-based carbon fiber. Among them, a milled fiber of a pitch-based carbon fiber is preferred. The carbon content of the carbon milled fiber is preferably 94% by mass or more. In a case where the carbon content is less than 94% by mass, the conductivity of the FRP to be obtained is easily lowered.

The metal particle is not particularly limited, however, in a case where the carbon fiber is used as a reinforcing fiber, in view of preventing the corrosion by the potential difference from the carbon fiber, a particle of platinum, gold, silver, copper, tin, nickel, titanium, cobalt, zinc, iron, chromium, or aluminum; a particle of an alloy in which these metals are used as a main component; and a particle of a tin oxide, an indium oxide, or an indium tin oxide (ITO) are preferred. Among them, in view of exhibiting a high conductivity and stability, each particle of platinum, gold, silver, copper, tin, nickel, and titanium, and a particle of an alloy in which these metals are used as a main component are more preferred, and each particle of silver, copper, and nickel is particularly preferred.

As a coating method of a core material composed of an inorganic material or an organic material with a conductive substance, a coating method by metal plating or mechanochemical bonding is preferred.

Examples of the coating method by metal plating include a wet plating method, and a dry plating method. Examples of the wet plating include electroless plating, displacement plating, and electroplating. Among them, the electroless plating can form a plating film onto the core material composed of a non-conductor, therefore is preferred. Examples of the dry plating include vacuum vapor deposition, plasma CVD (chemical vapor deposition), optical CVD, ion plating, and sputtering. Among them, the sputtering can obtain high adhesion at a low temperature, therefore is preferred.

The mechanochemical bonding is a preparing method of a composite fine particle in which a core material and a coating material are firmly bonded each other in the interface at the molecular level by the addition of a mechanical energy. Examples of the coating material include a metal particle, a carbon nano-material, and a vapor-grown carbon fiber (VGCF). These conductive particles may be used alone, or in combination with two or more kinds.

The mixing amount of the conductive particles is preferably 0.2 to 20 parts by mass, more preferably 1 to 15 parts by mass, and particularly preferably 5 to 15 parts by mass based on 100 parts by mass of the epoxy resin contained in the epoxy resin composition [A]. In a case where the mixing amount is less than 0.2 part by mass, the conductivity in the thickness direction of the FRP to be obtained is hardly improved. Further, in a case where the mixing amount exceeds 20 parts by mass, there may be a case in which the viscosity of the resin composition is significantly high and the handling property is deteriorated.

The average particle diameter of the conductive particles is preferably 0.01 to 200 µm, more preferably 0.01 to 100 µm, and further preferably 0.01 to 50 µm. When the average particle diameter of the conductive particles is 0.01 to 200 µm, some of the conductive particles are adequately dispersed also in the reinforcing fiber layer during the molding, therefore, the conductivity of the FRP to be obtained is easily improved. Further, the average particle diameter in the present invention means a value of 50% particle diameter ($D_{50}$) in the particle size distribution measured by using a laser diffraction scattering method.

The shape of the conductive particle is not particularly limited, and may be a shape of a spherical particle, a non-spherical particle, or a porous particle. From the viewpoint of forming a conductive bridge between the reinforcing fiber layers, the conductive particle preferably has a large aspect ratio. The aspect ratio is preferably 5 or more, and more preferably 10 to 100 on average.

In the present invention, the aspect ratio means a ratio of the longest length to the shortest length in a three-dimensional body. The aspect ratio is, as described below, calculated from the particle diameter measured by an optical microscope, or a scanning electron microscope.

(h) Curing Agent

A curing agent to cure the epoxy resin is mixed into the epoxy resin compositions [A] and/or [B], as needed. In a case where a curing agent is not contained in the epoxy resin composition [A], the prepreg to be obtained has less change of the tackiness with the lapse of time, and is excellent in the storage stability. In others, the curing agent is as described in the above (c).

(i) Thermoplastic Resin

In the epoxy resin composition [A], a thermoplastic resin may be contained in order to adjust the viscosity of the resin composition, or to improve the impact resistance of the FRP to be obtained. In particular, an epoxy resin-soluble thermoplastic resin is preferably contained.

The thermoplastic resin mixed into the epoxy resin composition [A] may be the same as, or different from the thermoplastic resin mixed into the epoxy resin composition [B]. As the thermoplastic resin, the same thermoplastic resin as that described in the above (b) may be used.

The mixing amount of the thermoplastic resin contained in the epoxy resin composition [A] is preferably 5 to 50 parts by mass, and more preferably 15 to 40 parts by mass based on 100 parts by mass of the epoxy resin contained in the epoxy resin composition [A]. In a case where the mixing amount is less than 5 parts by mass, there may be a case in which the impact resistance of the FRP to be obtained is insufficient. In a case where the mixing amount exceeds 50 parts by mass, there may be a case in which the viscosity is significantly high and the handling property is significantly deteriorated.

In the prepreg of the present invention, as to the viscosity of the epoxy resin composition [A], the viscosity at 80° C. obtained from a temperature-viscosity curve measured by using a rheometer is preferably 100 to 5000 poise, more preferably 100 to 4000 poise, further preferably 100 to 3000 poise, and particularly preferably 200 to 2000 poise. When the viscosity is 100 poise or more, adequate cohesion is imparted to the epoxy resin composition [A], and tackiness can be added to the prepreg to be obtained. Further, the conductive particles contained in the epoxy resin composition [B] are prevented from being detached from the prepreg, the effect that the conductive particles remain in the vicinity of the surface of the prepreg becomes high, and the conductivity in the thickness direction of the FRP to be obtained by the curing of the prepreg tends to become higher. When the viscosity of the epoxy resin composition [A] is extremely high, the handling property of the prepreg tends to be deteriorated. Further, the lowest resin viscosity of the epoxy resin composition [A] is preferably 4000 poise or less.

(j) Other Components

Into the epoxy resin composition [A], other components may be contained as long as the object and effect of the present invention are not impaired. The other components are as described in the above (e).

Hereinafter, more preferred embodiment of the prepreg of the present invention will be described.

As the more preferred embodiment of the prepreg of the present invention, a prepreg in which the epoxy resin composition [B] is an epoxy resin composition [B] in which conductive particles having an average particle diameter of 10 to 200 μm, and more preferably 50 to 200 μm by a laser diffraction method are further contained is mentioned. In the prepreg, a resin composition (I) with which a primary prepreg has been impregnated contains coarse conductive particles. When the reinforcing fiber layer is impregnated with the resin composition (I), the coarse conductive particles remain on the surface of the reinforcing fiber layer, therefore, the conductive particles are localized in the surface layer of the prepreg. Herein, the "coarse" means that, based on the distance between the single fibers constituting the reinforcing fibers, the size is larger than the distance.

In the conductive particles having an average particle diameter of 10 to 200 μm by a laser diffraction method, the particle diameter is larger than the distance between the single fibers of the reinforcing fiber layer, therefore, the conductive particles hardly enter the reinforcing fiber layer. Therefore, the reinforcing fiber layer is impregnated with the epoxy resin composition [B], the conductive particles remain on the surface of the reinforcing fiber layer, and are exposed. Further, in the present invention, a surface layer composed of an epoxy resin composition [A] is integrated onto at least one surface of the primary prepreg. Therefore, the conductive particles in the present invention are localized on from the surface of the prepreg to the reinforcing fiber layer.

In the prepreg of the present embodiment, the epoxy resin composition [A] is preferably composed of an epoxy resin composition [A] containing a thermoplastic resin.

Figure 4:
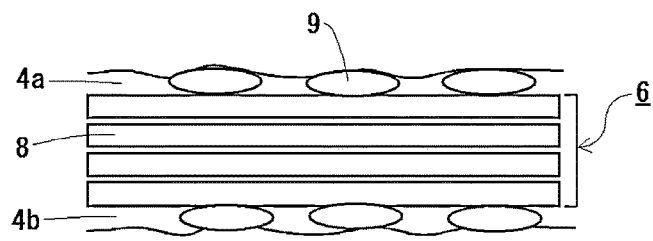
FIG. 4 is a partially enlarged drawing illustrating one example of the prepreg of the present invention.

FIG. 4 is a partially enlarged drawing of the prepreg using an epoxy resin composition [B] containing the conductive particles having an average particle diameter of 10 to 200 μm by a laser diffraction method. At least on one side (both sides in the present drawing) of the primary prepreg 6 having a thickness of 0.01 to 4 mm, and preferably 0.1 to 2.0 mm, surface layers 4a and 4b composed of an epoxy resin composition [A] having a thickness of 2 to 40 mm, and preferably 5 to 30 mm are formed. In this prepreg, when the reinforcing fiber layer is impregnated with the epoxy resin composition [B], the conductive particles having a large particle diameter are filtered out by the reinforcing fiber layer, and remain on the surface of the reinforcing fiber layer. Therefore, at least some of the conductive particles 9 contained in the epoxy resin composition [B] are distributed in the surface layer. Further, 8 shows reinforcing fibers.

Figure 5:
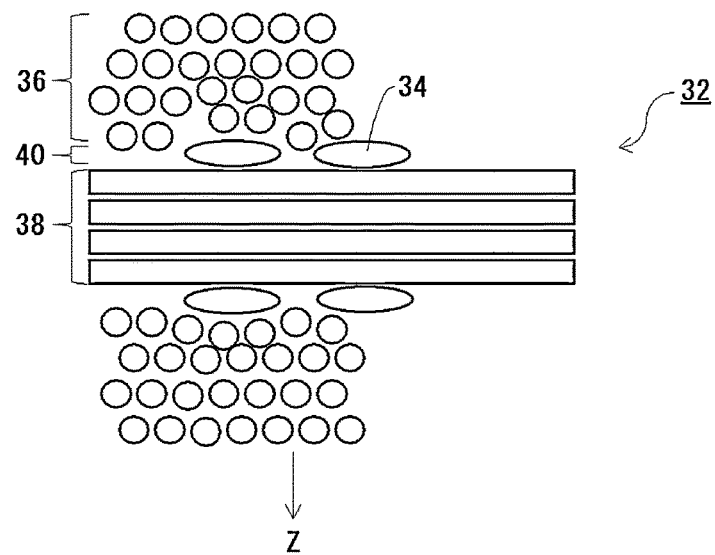
FIG. 5 is a partially enlarged drawing illustrating one example of the composite material produced by the laminating and heat molding of the prepreg of the present invention.

FIG. 5 is a conceptual drawing of the FRP produced by the laminating and heat molding of the prepreg of the present invention. In the fiber reinforced composite material (FRP) obtained by the laminating and curing of multiple prepregs, the conductive particles 34 exist in a resin layer 40 existing between layers of the reinforcing fiber layer 36 and the reinforcing fiber layer 38 that are adjacent to each other, serve as a conductive bridge in the thickness direction Z by the connection between the reinforcing fiber layers 36 and 38, and improve the conductivity in the thickness direction Z.

If the particle diameter of the conductive particle is larger than 10 μm, the conductive particle is hardly buried in the resin layer, a conductive path between the reinforcing fiber layers that are adjacent to each other is sufficiently formed, and the sufficient conductivity is obtained in the FRP to be obtained.

In the prepreg of the present embodiment, as to the viscosity of the epoxy resin composition [A], the viscosity at 80° C. obtained from a temperature-viscosity curve measured by using a rheometer is preferably 100 to 1000 poise, and more preferably 200 to 800 poise. When the viscosity is 100 poise or more, adequate cohesion is imparted to the epoxy resin composition [A], and tackiness can be added to the prepreg to be obtained. Further, the conductive particles contained in the epoxy resin composition [B] are prevented from being detached from the prepreg, the effect that the conductive particles remain in the vicinity of the surface of the prepreg becomes high, and the conductivity in the thickness direction of the FRP to be obtained by the curing of the prepreg tends to become higher. When the viscosity exceeds 1000 poise, the viscosity of the resin composition is extremely high, and the handling property of the prepreg tends to be deteriorated.

The viscosity of the epoxy resin composition [A] is appropriately adjusted by the content of the thermoplastic resin of the epoxy resin composition [A]. The mixing amount of the thermoplastic resin contained in the epoxy resin composition [A] is preferably 5 to 50 parts by mass, and more preferably 15 to 40 parts by mass based on 100 parts by mass of the epoxy resin contained in the epoxy resin composition [A]. When the mixing amount is 5 parts by mass or more, the sufficient viscosity can be given to the epoxy resin composition [A], and further, the impact resistance of the FRP to be obtained can be improved. In a case where the mixing amount exceeds 50 parts by mass, there may be a case in which the viscosity is significantly high and the handling property is significantly deteriorated.

In a case where an epoxy resin composition [B] containing the conductive particles having an average particle diameter of 10 to 200 μm by a laser diffraction method is used, the average particle diameter of the conductive particles contained in the epoxy resin composition [A] is preferably 0.01 to 30 μm, more preferably 0.01 to 15 μm, and particularly preferably 0.01 to 8 μm. In particular, when the average particle diameter of the conductive particles is 0.01 to 8 μm, some of the conductive particles are adequately dispersed also in the reinforcing fiber layer during the molding of the FRP, therefore, the conductivity of the FRP to be obtained is easily improved.

As another more preferred embodiment of the prepreg of the present invention, a prepreg in which the resin composition (I) is composed of an epoxy resin composition [B] containing substantially no curing agent for an epoxy resin, and the resin composition (II) is composed of an epoxy resin composition [A] containing a curing agent for an epoxy resin is mentioned. In the prepreg, the resin composition (II) forming the surface layer has high viscosity because of containing a curing agent. Therefore, the conductive particles in the surface layer hardly move into the inner layer, and thus remain in the surface layer of the prepreg.

Further, the prepreg of the present embodiment shows excellent draping property and tackiness over a long period of time because a curing agent does not substantially exist in the inner layer of the prepreg. As a result, a structural defect such as a void is hardly generated in the FRP prepared by the lamination of multiple prepregs after the prepregs have stored for a long period of time.

The epoxy resin composition [A] in the prepreg of the present embodiment contains a curing agent in a large amount, therefore, the viscosity is high, and the conductive particles contained in the epoxy resin composition [A] are hardly precipitated into the inner layer of the prepreg even in a long-term storage. Therefore, the conductive particles remain in the surface layer of the prepreg.

In the production process of a FRP, the conductive particles remained in the surface layer of the prepreg move from the surface layer of the prepreg towards the reinforcing fiber layer in the primary prepreg by a flow of the resin in the curing process. Therefore, in the FRP obtained by using the prepreg of the present invention, the conductive particles are dispersed in the entire thickness direction from the surface layer to reinforcing fiber layer of the FRP, a conductive path is formed between the reinforcing fiber layers that are adjacent to each other, as a result, the conductivity becomes high. Further, the conductivity in the surface direction of the FRP is secured by reinforcing fibers in a case where the reinforcing fibers have conductivity.

In the prepreg of the present embodiment, the mass ratio of the epoxy resin contained in the epoxy resin composition [B] that is used for a primary prepreg to the epoxy resin contained in the epoxy resin composition [A] that is used for a surface layer is preferably 1:1 to 5:1.

In the prepreg of the present embodiment, the epoxy resin composition [A] contains a curing agent in an amount larger than that of an ordinary resin composition, and the viscosity is high, therefore, the conductive particles contained in the epoxy resin composition [A] are hardly precipitated into the inner layer of the prepreg.

In the prepreg of the embodiment, the epoxy resin composition [A] adjusts the viscosity of the resin, and preferably contains a thermoplastic resin for the purpose of the improvement of the impact resistance of the FRP to be obtained. The content of the thermoplastic resin contained in the epoxy resin composition [A] may appropriately be adjusted depending on the kind of the epoxy resin to be used, or the characteristics of the prepreg or FRP to be required. For example, in a case where a polyfunctional novolac type epoxy resin is contained in an amount of 15% by mass or more, and preferably 30 to 50% by mass based on the total amount of the epoxy resin mixed into the epoxy resin compositions [A] and the epoxy resin composition [B], that is, the amount of the whole epoxy resin, a prepreg having a favorable handling property and a FRP having high impact resistance are obtained even in a case where the thermoplastic resin is contained in an amount of less than 5 parts by mass or not contained based on 100 parts by mass of the epoxy resin contained in the epoxy resin composition [A].

In the present embodiment, as to the preferable viscosity of the epoxy resin composition [A], the lowest resin viscosity is 1000 to 4000 poise, and more preferably the lowest resin viscosity is 1000 to 3000 poise. When the lowest resin viscosity is 1000 poise or more, the effect that the conductive particles contained in the epoxy resin composition [A] remain in the vicinity of the surface of the prepreg is high, and the conductivity in the thickness direction of the FRP to be obtained by the curing of the prepreg tends to become higher. In a case where the lowest resin viscosity exceeds 4000 poise, the viscosity of the resin composition is extremely high, and the handling property is deteriorated, for example, the draping property and tackiness of the prepreg are deteriorated, therefore, the case is not preferred.

In the present invention, the epoxy resin composition [A] contains conductive particles. In the FRP to be obtained by the curing of the prepreg, the conductive particles serve as a conductive bridge in the thickness direction of the surface layer formed by the curing of the epoxy resin composition [A], and connect the reinforcing fiber layers with each other in the thickness direction, as a result, the conductivity in the thickness direction is improved. At this time, a large majority of conductive particles are desirably in the surface layer of the FRP. The conductive particles contained in the epoxy resin composition [A] are dispersed in the surface layer in an amount larger than that in the inner layer of the prepreg also in the present embodiment. As a result, also in the FRP obtained by the laminating and curing of the prepreg, the conductive particles are easily dispersed in the resin layer corresponding to the surface layer of the prepreg rather than the reinforcing fiber layer corresponding to the inner layer of the prepreg.

In the present embodiment, the conductive particles contained in the epoxy resin composition [A] preferably have an average particle diameter of less than 10 μm. When the average particle diameter is less than 10 μm, some of the conductive particles are adequately dispersed in the reinforcing fiber layer during the molding, therefore, the conductivity of the FRP to be obtained is easily improved. The average particle diameter of the conductive particles is more preferably 0.01 μm or more.

In the present embodiment, the epoxy resin composition [B] does not contain a curing agent. Therefore, the amount of the curing agent contained in the epoxy resin composition [A] is preferably appropriately adjusted and mixed in an amount sufficient for curing the whole epoxy resin mixed into the epoxy resin composition [A] and the epoxy resin composition [B] depending on the kinds of the epoxy resin and curing agent to be used. For example, in a case where an aromatic diamine compound is used as a curing agent, the amount of the curing agent is preferably 50 to 180 parts by mass based on 100 parts by mass of the total amount of the epoxy resin contained in the epoxy resin composition [A] and the epoxy resin composition [B]. Further, the amount of the curing agent contained in the epoxy resin composition [A] is preferably 80 to 170 parts by mass, and more preferably 100 to 160 parts by mass based on 100 parts by mass of the epoxy resin used in the epoxy resin composition [A], from the viewpoint of the storage stability.

In the present embodiment, a curing agent in an amount adequate for curing the whole epoxy resin contained in the prepreg is contained in the epoxy resin composition [A]. Therefore, in the epoxy resin composition [A], an epoxy resin composition is contained in an amount larger than that contained in an ordinary epoxy resin composition. However, the epoxy resin composition [A] is not exposed to an excessive heat history that promotes a reaction during the production of prepreg, therefore, the curing of the resin composition by a crosslinking reaction of the epoxy resin can be suppressed. Further, a curing agent for an epoxy resin is localized in the prepreg, therefore, the curing reaction does not proceed in the epoxy resin composition [B] in which a curing agent has not contained. Therefore, in the prepreg of the present invention, the tackiness and draping property are not lowered over a long period of time.

As the further preferred embodiment of the prepreg of the present invention, a prepreg in which the resin composition (I) is composed of an epoxy resin composition [B] in which conductive particles having an average particle diameter of 500 nm or less by a laser diffraction method are contained is mentioned. In the present embodiment, the thermoplastic resin contained in the epoxy resin composition [B] is preferably an epoxy resin-soluble thermoplastic resin having a weight average molecular weight of 8000 to 40000.

In the present embodiment, the conductive particles are dispersed in the surface layer of the prepreg, and further fine conductive particles having an average particle diameter of 500 nm or less are dispersed in the inner layer of the prepreg. The resin composition (I) forming an inner layer in the present invention contains an epoxy resin-soluble thermoplastic resin, therefore, the viscosity is high. Therefore, the conductive particles in the surface layer and the conductive particles in the inner layer hardly move with respect to each other. In the FRP prepared by using the prepreg, a conductive bridge is formed by the conductive particles, therefore, the high conductivity and impact resistance are both provided in the thickness direction.

In the present embodiment, the epoxy resin composition [B] preferably contains an epoxy resin-soluble thermoplastic resin having a weight average molecular weight of 8000 to 40000. The epoxy resin-soluble thermoplastic resin adjusts the viscosity of the epoxy resin composition [B], and improves the impact resistance of the FRP to be obtained. The amount of the epoxy resin-soluble thermoplastic resin having a weight average molecular weight of 8000 to 40000 contained in the epoxy resin composition [B] is preferably an amount with which the lowest viscosity of the epoxy resin composition [B] is 50 to 3000 poise.

The epoxy resin composition [B] that contains an epoxy resin-soluble thermoplastic resin having a weight average molecular weight of 8000 to 40000 has adequate viscosity, therefore, the reinforcing fiber layer can sufficiently be impregnated. On the other hand, the epoxy resin composition [A] placed on the surface layer of the primary prepreg is prevented from sinking in the reinforcing fiber layer. Therefore, the fine conductive particles contained in the epoxy resin composition [B] are dispersed in the reinforcing fiber layer, and hardly diffused in the surface layer.

On the other hand, the conductive particles contained in the epoxy resin composition [A] remain in the surface layer of the prepreg. As a result, in the prepreg of the present embodiment, the prepreg itself has excellent conductivity in the thickness direction, and further the excellent conductivity in the thickness direction is possessed also in the FRP obtained by the laminating and curing of the prepreg.

In the present embodiment, into the epoxy resin composition [B], conductive particles having an average particle diameter of 500 nm or less by a laser diffraction method (hereinafter, also referred to as "conductive fine particles") are mixed. Further, also into the epoxy resin composition [A], conductive particles having an average particle diameter of 500 nm or less by a laser diffraction method are preferably mixed. In the FRP to be obtained by the curing of the prepreg, the conductive particles are uniformly dispersed in the resin layer and the reinforcing fiber layer, and serve as a conductive bridge. As a result, the conductivity in the thickness direction of the FRP is improved. The average particle diameter of the conductive fine particles is more preferably 200 nm or less, and particularly preferably 100 nm or less. The lower limit value of the average particle diameter is not particularly limited, however, in general, 1 nm or more.

The mixing amount of the conductive fine particles is 0.2 to 20 parts by mass, and preferably 0.7 to 15 parts by mass, respectively, based on 100 parts by mass of the epoxy resin contained respectively in the epoxy resin compositions [A] and [B]. In a case where the mixing amount is less than 0.2 part by mass, the conductivity in the thickness direction of the FRP to be obtained is hardly improved. Further, in a case where the mixing amount exceeds 20 parts by mass, there may be a case in which the viscosity of the resin composition is significantly high and the handling property is deteriorated.

Further in the present embodiment, in order to impart the conductivity to the FRP to be obtained by the laminating and curing of the prepreg, into the epoxy resin compositions [A] and/or [B], conductive particles having an average particle diameter of 5 to 250 μm by a laser diffraction method (hereinafter, also referred to as "conductive coarse particles") are preferably mixed. In the FRP obtained by the laminating and curing of the prepreg, the conductive coarse particles are localized in the interlayer part between the reinforcing fiber layers of the laminated prepreg, and have a role to electrically connect the reinforcing fiber layers with each other of the prepreg. As a result, the conductivity in the thickness direction of the FRP is improved. The average particle diameter of the conductive coarse particles is more preferably 7 to 200 μm.

The shape of the conductive coarse particle is not particularly limited, and may be a shape of a spherical particle, a non-spherical particle, or a porous particle. From the viewpoint of forming a conductive bridge between the reinforcing fiber layers, the conductive coarse particle preferably has a large aspect ratio. The aspect ratio is preferably 5 or more, and more preferably 10 to 100 on average.

The mixing amount of the conductive coarse particles is preferably 0.2 to 20 parts by mass, and more preferably 0.7 to 10 parts by mass, respectively, based on 100 parts by mass of the epoxy resin contained respectively in the epoxy resin compositions [A] and [B]. In a case where the mixing amount is less than 0.2 part by mass, the conductivity in the thickness direction of the FRP to be obtained is hardly improved. Further, in a case where the mixing amount exceeds 20 parts by mass, there may be a case in which the viscosity of the resin composition is significantly high and the handling property is deteriorated.

As to the preferred viscosity of the epoxy resin composition [A] in the present embodiment, the viscosity at 80° C. obtained from a temperature-viscosity curve measured by using a rheometer is 100 to 5000 poise, and more preferably the viscosity at 80° C. is 200 to 2000 poise. When the viscosity is 100 poise or more, adequate cohesion is imparted to the epoxy resin composition [A], and tackiness can be imparted to the prepreg to be obtained. Further, the conductive coarse particles are prevented from being detached from the prepreg, and the effect that the conductive coarse particles are localized in the vicinity of the surface of the prepreg and maintained becomes high. As a result, the conductivity in the thickness direction of the FRP obtained by the curing of the prepreg tends to become higher. When the viscosity exceeds 5000 poise, the viscosity of the resin composition is extremely high, and the handling property of the prepreg tends to be deteriorated.

In order to obtain the viscosity of the epoxy resin composition [A] at 80° C. to be 100 to 5000 poise, the mixing amount of the thermoplastic resin contained in the epoxy resin composition [A] is preferably 5 to 50 parts by mass, and more preferably 15 to 40 parts by mass based on 100 parts by mass of the epoxy resin contained in the epoxy resin composition [A].

The average particle diameter of the conductive fine particles mixed into the epoxy resin composition [A] is preferably 500 nm or less, more preferably 20 to 300 nm, and particularly preferably 20 to 100 nm. The smaller the average particle diameter of the conductive fine particles is, the easer the improvement of the conductivity of the FRP to be obtained is, because some of the conductive fine particles are adequately dispersed in the reinforcing fiber layer during the molding.

(3) Production Method of Prepreg

The prepreg of the present invention is produced by the heat-pressing of a primary prepreg obtained by the impregnation with an epoxy resin composition [B] and a sheet of an epoxy resin composition [A] that is a surface layer to integrate.

Figure 2:
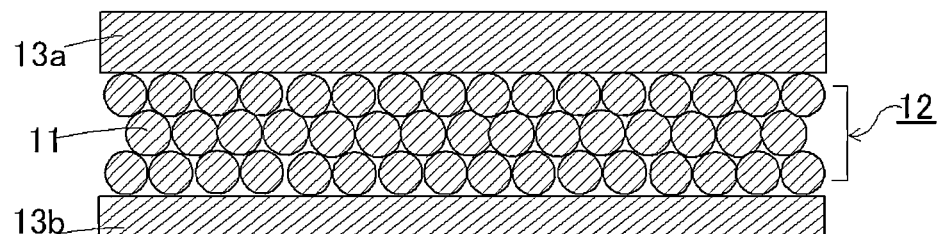
FIGS. 2(a) to 2(c) are conceptual drawings illustrating one example of a process of producing the prepreg of the present invention.
Figure 2:
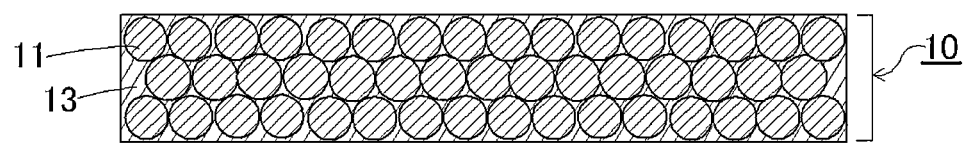
Figure 2:
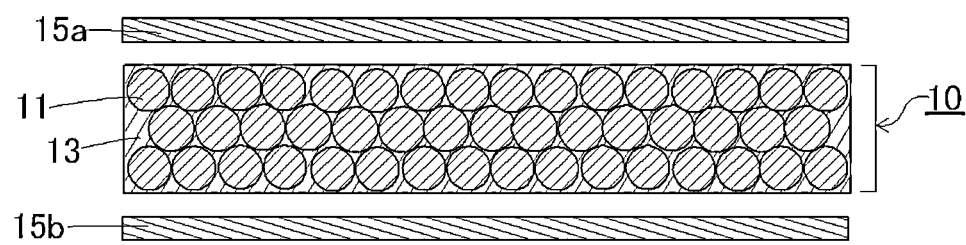

FIGS. 2(a) to 2(c) are explanatory drawings sequentially illustrating a process of producing the prepreg of the present invention. First, on both sides in the thickness direction of the reinforcing fiber layer 12 composed of reinforcing fibers 11, resin [B] sheets 13a and 13b which are composed of an epoxy resin composition [B] are laminated, respectively (FIG. 2 (a)). The reinforcing fiber layer 12 and the resin [B] sheets 13a and 13b are heat-pressed by using a hot roller or the like. By the heat-pressing, the reinforcing fiber layer 12 is impregnated with the epoxy resin composition [B], and a primary prepreg 10 is obtained (FIG. 2 (b)). After that, on both sides of the primary prepreg 10, resin [A] sheets 15a and 15b which are composed of an epoxy resin composition [A] are laminated, respectively (FIG. 2(c)). The primary prepreg 10 and the resin [A] sheets 15a and 15b are heat-pressed by using a hot roller or the like. By the heat-pressing, the primary prepreg 10 and the resin [A] sheets 15a and 15b are integrated, and the prepreg 100 (FIG. 1) of the present invention is obtained.

Figure 3:
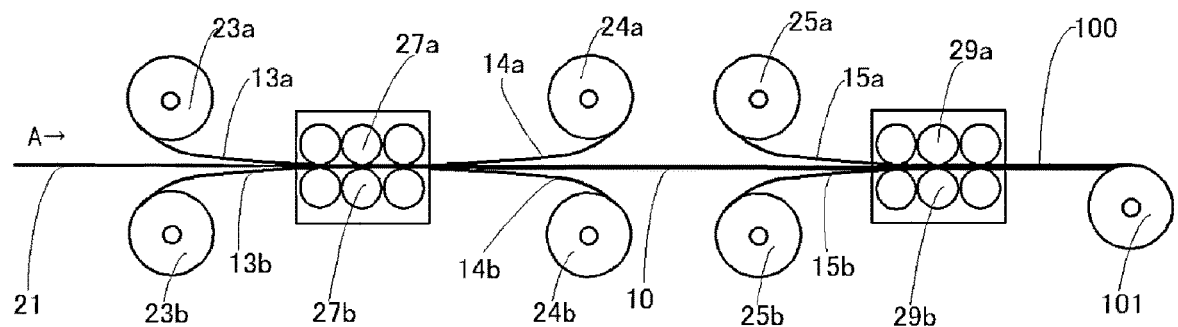
FIG. 3 is a conceptual drawing illustrating one example of a process of producing the prepreg of the present invention.

FIG. 3 is a conceptual drawing illustrating one example of a process of producing the prepreg of the present invention. In FIG. 3, 21 shows a reinforcing fiber layer in which fibers such as carbon fibers are arranged in parallel, and runs to an arrow A direction. On both sides in the thickness direction of the reinforcing fiber layer 21, resin [B] sheets 13a and 13b with release papers 14a and 14b, which are fed from sheet rolls 23a and 23b, respectively are laminated, respectively. The reinforcing fiber layer 21 and the resin [B] sheets 13a and 13b are heat-pressed by using hot rollers 27a and 27b via the release papers 14a and 14b. By the heat-pressing, the reinforcing fiber layer 21 is impregnated with the resin composition of the resin [B] sheets 13a and 13b, and a primary prepreg 10 is formed. After that, the release papers 14a and 14b laminated on both sides of the primary prepreg 10 are wound onto rollers 24a and 24b, respectively, and removed from the primary prepreg 10. Next, on both sides of the primary prepreg 10 from which release papers have been removed, resin [A] sheets 15a and 15b with release papers, which are fed from sheet rolls 25a and 25b, respectively are laminated, respectively. The primary prepreg 10 and the resin [A] sheets 15a and 15b are heat-pressed by using hot rollers 29a and 29b via the release papers. By the heat-pressing, a prepreg 100 of the present invention is formed. The prepreg 100 on both sides of which release papers adhere is wound onto a roller 101.

(3-1) Production of Primary Prepreg

The primary prepreg is produced by the impregnation of the reinforcing fiber layer with an epoxy resin composition [B]. Examples of the impregnation method include a dry method in which the reinforcing fiber layer is impregnated with the resin composition having a viscosity lowered by the heating. The dry method is preferred because the organic solvent does not remain as compared with a wet method in which the reinforcing fiber layer is impregnated with the resin composition dissolved in an organic solvent, and then the organic solvent is removed. Hereinafter, a method for producing a prepreg by a dry method will be described.

(3-1-1) Production of Epoxy Resin Composition [B]

The epoxy resin composition [B] can be produced by the kneading of the essential components described above and the optional components. The kneading temperature is appropriately adjusted in consideration of the viscosity of the resin to be mixed, the heat characteristics, the curing temperature, and the like, however, is a temperature of the curing starting temperature or lower, and preferably 50 to 120° C. The kneading may be performed in one stage, or in multiple stages. Further, the mixing order of each of the components of the epoxy resin composition [B] is not limited. In a case where an epoxy resin-soluble thermoplastic resin is used, the whole amount or part of the epoxy resin-soluble thermoplastic resin is dissolved into an epoxy resin in advance, and then the resultant can be kneaded. Further, the epoxy resin-soluble thermoplastic resin may be mixed into an epoxy resin as a dispersed particle in a state of powder and the like. As a kneading mechanical apparatus, a conventionally known one such as a roll mill, a planetary mixer, a kneader, an extruder, and a Banbury mixer can be used.

(3-1-2) Impregnation of Epoxy Resin Composition [B]

A method for impregnating a reinforcing fiber layer with an epoxy resin composition [B] is not particularly limited. A particularly preferred impregnation method will be described below.

First, a resin sheet composed of an epoxy resin composition [B] (also referred to as "resin [B] sheet") is prepared. The resin sheet can be prepared by a known method. For example, the resin sheet can be prepared by the casting onto a support such as a release paper, and a release sheet, by using a die coater, an applicator, a reverse roll coater, a comma coater, a knife coater, or the like. The resin temperature in the sheeting is appropriately set depending on the composition or viscosity of the resin.

The processing temperature in the sheeting of an epoxy resin composition [B] is, in general, preferably 70 to 160° C., and more preferably 75 to 140° C. In a case where the processing temperature is lower than 70° C., the viscosity of the epoxy resin composition [B] is high, therefore, the reinforcing fiber layer is hardly impregnated with the epoxy resin composition [B]. In a case where the processing temperature exceeds 160° C., the epoxy resin composition [B] is easily cured, and the draping property of the prepreg to be obtained is easily deteriorated. In a case where the epoxy resin composition [B] is sheeted, the sheeting is performed in as short a time as possible. Consequently, the curing of the epoxy resin composition [B] can substantially be prevented.

The thickness of the resin [B] sheet is preferably 2 to 500 µm, and more preferably 5 to 100 µm.

Next, the reinforcing fiber layer is impregnated with the epoxy resin composition [B] in a sheet shape, which has been obtained in the above. The resin [B] sheet is laminated on one side or both sides of the reinforcing fiber layer, and then the laminate is heat-pressed. By the heating treatment under pressure, the viscosity of the epoxy resin composition [B] is lowered, and gaps of the reinforcing fiber layer are impregnated with the epoxy resin composition [B].

The heating temperature of the impregnation treatment can appropriately be adjusted in consideration of the viscosity, curing temperature, and the like of the epoxy resin composition [B]. The heating temperature is preferably 70 to 160° C., and more preferably 90 to 140° C. In a case where the impregnation temperature is lower than 70° C., the viscosity of the epoxy resin composition [B] is high, therefore, the reinforcing fiber layer is hardly impregnated with the epoxy resin composition [B]. In a case where the impregnation temperature exceeds 160° C., the epoxy resin composition [B] is easily cured. As a result, the draping property of the prepreg to be obtained is easily lowered.

The time for the impregnation treatment is preferably 10 to 300 seconds.

The pressure condition of the impregnation treatment is appropriately adjusted depending on the composition or viscosity of the epoxy resin composition [B], however, the line pressure is preferably 9.8 to 245 N/cm (1 to 25 kg/cm), and more preferably 19.6 to 147 N/cm (2 to 15 kg/cm). In a case where the line pressure is lower than 9.8 N/cm, the reinforcing fiber layer is difficult to be sufficiently impregnated with the epoxy resin composition [B]. In a case where the line pressure exceeds 245 N/cm, the reinforcing fibers are easily damaged.

The method of the impregnation treatment can be performed by a conventionally known method using a hot roller or the like. The impregnation treatment may be performed in one time, or in multiple times. As described above, the primary prepreg in which the reinforcing fiber layer has been impregnated with the epoxy resin composition [B] is produced.

(3-2) Production of Epoxy Resin Composition [A]

The epoxy resin composition [A] can be produced by the kneading of the essential components described above and the optional components. As to the production method of the epoxy resin composition [A], the epoxy resin composition [A] can be produced in the same manner as in the epoxy resin composition [B] described in the above (3-1-1).

The obtained epoxy resin composition [A] is processed into a sheet shape in order to be laminated on the surface of the primary prepreg in a sheet shape. As to the processing method, the same method as that of the resin [B] sheet, which has been described in the above (3-1-2), can be used.

The thickness of the resin [A] sheet is preferably 2 to 30 µm, and particularly preferably 5 to 20 µm. In a case where the thickness is less than 2 µm, the tackiness of the prepreg to be obtained is lowered. In a case where the thickness exceeds 30 µm, the handling property of the prepreg to be obtained, and the molding precision of the FRP to be obtained are easily lowered.

(3-3) Integral Lamination of Primary Prepreg and Resin [A] Sheet

The resin [A] sheet is laminated at least on one surface of the primary prepreg, and the resultant is heat-pressed, as a result, a prepreg of the present invention, in which the primary prepreg and the resin [A] sheet have been integrated, is obtained.

The heating temperature can appropriately be adjusted in consideration of the viscosity, curing temperature, and the like of the epoxy resin composition [A], however, is preferably 50 to 90° C., and more preferably 60 to 80° C. In a case where the heating temperature is lower than 50° C., the viscosity of the epoxy resin composition [A] is high, and the process stability during the production of the prepreg may be impaired. In a case where the heating temperature exceeds 90° C., the epoxy resin composition [A] and the epoxy resin composition [B] constituting the primary prepreg are mixed, and a curing reaction easily proceeds. As a result, in a case where the prepreg to be obtained is stored for a long period of time, the tackiness and the draping property are easily lowered.

The pressure condition is appropriately adjusted depending on the composition or viscosity of the epoxy resin composition [B], however, the line pressure is preferably 0.98 to 98 N/cm (0.1 to 10 kg/cm), and more preferably 4.9 to 58.8 N/cm (0.5 to 6 kg/cm). Ina case where the line pressure is less than 0.98 N/cm, the primary prepreg and the resin [A] sheet are not sufficiently bonded. In a case where the line pressure exceeds 98 N/cm, the epoxy resin composition [A] sinks in the epoxy resin composition [B] with which the primary prepreg has been impregnated. In this case, the conductive particles contained in the epoxy resin composition [A] are easily diffused into the epoxy resin composition [B], therefore, the conductivity of the FRP to be obtained by the molding of the prepreg tends to be lowered.

According to the production method described above, the epoxy resin composition [A] is integrated onto the surface of the primary prepreg, and the surface layer of the prepreg of the present invention is formed.

The conductive particles of the epoxy resin composition [B] are localized on the outside of the reinforcing fiber layer by heat-pressing.

The production rate of the prepreg is not particularly limited, however, 0.1 m/min or more, preferably 1 m/min or more, and particularly preferably 5 m/min or more considering the productivity, the economic efficiency, and the like.

The present prepreg can be produced not only by the production method described above, but also, for example, by the sequential lamination of the resin [B] sheet and the resin [A] sheet on one side or both sides in the thickness direction of the reinforcing fiber layer, and then by the heat-pressing of the resultant in one stage. In this case, the heat-pressing is preferably performed at a low temperature (50 to 90° C.) so as not to diffuse the curing agent contained in the epoxy resin compositions [A] and/or [B].

Into the present prepreg, a stabilizer, a release agent, a filler, a coloring agent, and the like may be mixed as long as the effect of the present invention is not impaired.

(4) Use Method of the Present Prepreg

In the present prepreg, a FRP can be prepared by the curing according to a known technique. Examples of the method for preparing a FRP using the present prepreg include a conventionally known method, for example, a method using manual lay-up, automatic tape lay-up (ATL), automatic fiber placement, vacuum bagging, autoclave curing, curing other than autoclave, fluid assisted process, pressure assisted process, match mold process, simple press curing, press clave curing, or continuous band press.

For example, the present prepreg is laminated, the resultant is pressurized at 0.2 to 1.0 MPa in an autoclave, heated at 150 to 204° C. for 1 to 8 hours, as a result, a FRP can be molded.

In the present prepreg, the curing agent is diffused into the epoxy resin compositions [A] and [B] by the heating during the curing reaction. Consequently, the epoxy resin compositions [A] and [B] are cured together.

In the production process of a FRP, the conductive particles existed in the surface layer of the prepreg are dispersed with a concentration distribution of gradually decreasing from the surface layer of the prepreg to the resin layer in the vicinity of the surface of the primary prepreg, and then towards the reinforcing fiber layer inside the primary prepreg by the flow of the resin in the curing process. Therefore, in the FRP obtained by using the prepreg of the present invention, the conductive particles exist in the entire thickness direction from the surface to reinforcing fiber layer of the FRP, as a result, the conductivity becomes high. Further, the conductivity in the face direction of the FRP is secured by reinforcing fibers in a case where the reinforcing fibers have conductivity.

The conductivity of the FRP to be obtained by using the present prepreg is 3.5 Ω·cm or less, and preferably 0.3 Ω·cm or less by the volume resistivity according to the measurement method described below.

EXAMPLES

Hereinafter, the present invention will be described in more detail by way of Examples, however, the present invention should not be construed to be limited to the Examples. The components and testing methods used in the present Examples and Comparative Examples are as follows.

[Component]

(Reinforcing Fiber)

Tenax (trade name) IMS 65 E 23 24K 830tex: manufactured by TOHO TENAX Co., Ltd., a carbon fiber strand, tensile strength: 5800 MPa (590 kgf/mm$^2$), and tensile elastic modulus: 290 GPa (30 tf/mm$^2$)

(Epoxy Resin)

Araldite MY0510 (trade name): manufactured by Huntsman Advanced Materials Co. Ltd., a glycidylamine type epoxy resin (trifunctional group) (hereinafter, abbreviated as "MY0510")

Araldite MY0600 (trade name): manufactured by Huntsman Advanced Materials Co. Ltd., a glycidylamine type epoxy resin (trifunctional group) (hereinafter, abbreviated as "MY0600")

Araldite MY0610 (trade name): manufactured by Huntsman Advanced Materials Co. Ltd., a glycidylamine type epoxy resin (trifunctional group) (hereinafter, abbreviated as "MY0610")

Araldite MY721 (trade name): manufactured by Huntsman Advanced Materials Co. Ltd., a glycidylamine type epoxy resin (tetrafunctional group) (hereinafter, abbreviated as "MY721")

Araldite MY725 (trade name): manufactured by Huntsman Advanced Materials Co. Ltd., a glycidylamine type epoxy resin (tetrafunctional group) (hereinafter, abbreviated as "MY725")

Sumi Epoxy ELM100 (trade name): manufactured by Sumitomo Chemical Co., Ltd., a glycidylamine type epoxy resin (trifunctional group) (hereinafter, abbreviated as "ELM100")

Epikote 154 (trade name): manufactured by Mitsubishi Chemical Corporation, a novolak type epoxy resin (polyfunctional group) (hereinafter, abbreviated as "jER154")

Epikote 604 (trade name): manufactured by Mitsubishi Chemical Corporation, a glycidylamine type epoxy resin (tetrafunctional group) (hereinafter, abbreviated as "jER604")

Epikote 828 (trade name): manufactured by Mitsubishi Chemical Corporation, a glycidyl ether type epoxy resin (bifunctional group) (hereinafter, abbreviated as "jER828")

(Epoxy Resin-Soluble Thermoplastic Resin)

Virantage VW-10200RSFP (trade name): manufactured by Solvay Specialty Polymers, polyethersulfone having an average particle diameter of 20 μm, and a weight average molecular weight (Mw) of 45,000

Virantage VW-10700RSFP (trade name): manufactured by Solvay Specialty Polymers, polyethersulfone having an average particle diameter of 20 μm, and a weight average molecular weight (Mw) of 22,000

Virantage DAMS VW-30500 RP (trade name): manufactured by Solvay Specialty Polymers, polysulfone having an average particle diameter of 100 μm, and a weight average molecular weight (Mw) of 14,000

Ultrason E2020P (trade name): manufactured by BASF, polyethersulfone having an average particle diameter of 20 μm Ultem 1000-1000 (trade name): manufactured by SABIC Innovative Plastics, polyetherimide having an average particle diameter of 20 μm UDEL (trade name): manufactured by Solvay Specialty Polymers, polysulfone having an average particle diameter of 20 μm PES-5003P (trade name): manufactured by Sumitomo Chemical Co., Ltd., polyethersulfone having an average particle diameter of 20 μm (Epoxy Resin-Insoluble Thermoplastic Resin)

TR-55 (trade name): manufactured by EMS-CHEMIE (Japan) Ltd., polyamide particles having an average particle diameter of 20 μm TR-90 (trade name): manufactured by EMS-CHEMIE (Japan) Ltd., polyamide particles having an average particle diameter of 20 μm ORGASOL1002D NAT (trade name): manufactured by Arkema Inc., polyamide particles having an average particle diameter of 20 μm MX nylon (trade name): manufactured by MITSUBISHI GAS CHEMICAL COMPANY, INC., polyamide particles having an average particle diameter of 20 μm (Curing Agent)

3,3'-Diaminodiphenylsulfone: manufactured by NIHON GOSEI KAKO Co., Ltd., an aromatic amine-based curing agent (hereinafter, abbreviated as "3,3'-DDS")

4,4'-Diaminodiphenylsulfone: manufactured by Wakayama Seika Kogyo Co., Ltd., an aromatic amine-based curing agent (hereinafter, abbreviated as "4,4'-DDS")

(Conductive Particle)

EC1500 (trade name): manufactured by Ito Graphite Co., Ltd, expanded graphite having an average particle diameter of 7 μm VGCF-H (trade name): manufactured by SHOWA DENKO K.K., vapor grown carbon fibers having an aspect ratio of 40, and a particle diameter of 150 nm (catalogue value)

51-R (trade name): manufactured by JX Nippon Mining & Metals Corporation, copper powders having an average particle diameter of 20 to 35 μm (catalogue value)

Ketjenblack EC300J (trade name): manufactured by Lion Corporation, conductive carbon black having an average particle diameter of 39.5 nm (catalogue value) (hereinafter, abbreviated as "carbon black")

Super fine silver powder (average particle diameter of 100 nm): manufactured by DOWA Electronics Materials Co., Ltd., the particle diameter is a catalogue value (hereinafter, abbreviated as "100 nm Ag")

Silver nanoparticle dried powder (average particle diameter of 20 nm): manufactured by DOWA Electronics Materials Co., Ltd., the particle diameter is a catalogue value (hereinafter, abbreviated as "20 nm Ag")

Dialead (trade name): manufactured by Mitsubishi Plastics, Inc., pitch-based carbon fiber milled fibers having an aspect ratio of 18, and an average particle diameter of 200 μm (catalogue value)

GRANOC (trade name): manufactured by Nippon Graphite Fiber Corporation, Ltd., pitch-based carbon fiber milled fibers having a particle diameter of 100 μm (catalogue value), and an aspect ratio of 8

EC1500 (trade name): manufactured by Ito Graphite Co., Ltd, spherical expanded graphite having an average particle diameter of 7 μm (hereinafter, abbreviated as "expanded graphite")

10% Ag-coated 2L3 (trade name): manufactured by Fukuda Metal Foil & POWDER Co., LTD., an average particle diameter of 31 μm (catalogue value), flaky silver-coated copper powders (non-spherical shape) (hereinafter, abbreviated as "copper powder")

[Average Particle Diameter]

The particle size distribution was measured by using a laser diffraction scattering type particle size analyzer (microtrack method) MT3300 manufactured by NIKKISO CO., LTD., and the 50% particle diameter ($D_{50}$) was set as the average particle diameter. Further, except as otherwise noted, the average particle diameter in the present invention means a value measured by the method.

[Aspect Ratio]

As to the aspect ratio, by using a confocal microscope HD100 manufactured by Nikon Corporation, the maximum particle diameter (fiber length in a case of fibrous shape) and the minimum particle diameter (fiber diameter in a case of fibrous shape) of each particle were measured (n=50), and the ratio (maximum particle diameter/minimum particle diameter) was set as the aspect ratio.

[Viscosity]

By using a rheometer ARES-RDA manufactured by Rheometrics, by using a parallel plate having a diameter of 25 mm, the thickness of the epoxy resin composition between the parallel plates was set as 0.5 mm, then viscosity measurement was performed up to 180° C. at a rising rate of 2° C./min under a condition of an angular velocity of 10 radian/sec, and the viscosity was determined from the temperature-viscosity curve.

[Compression Strength after Impact (CAI)]

The obtained prepreg was cut into a square with sides of 360 mm, and the square was laminated to obtain a laminate having a lamination structure $[+45/0/-45/90]_{3s}$. By using an ordinary vacuum autoclave molding method, molding was performed under a pressure of 0.59 MPa and a condition of 180° C. for two hours. The obtained molded material was cut into a size of 101.6 mm in width×152.4 mm in length to obtain a test specimen for the test of compression strength after impact (CAI). By using the test specimen, in accordance with SACMA SRM 2R-94, the compression strength (CAI) was measured after the test specimen was subjected to an impact of 30.5 J to be damaged. The crosshead speed of a test specimen compression testing machine was set as 1.27 mm/min, and the measurement was performed with n=5.

[Interlaminar Fracture Toughness Mode I (GIc)]

The obtained prepreg was cut into a square with sides of 360 mm, and then the square was laminated to prepare two laminates laminated with 10 layers in a 0° direction. In order to generate an initial crack, a release sheet was sandwiched between the two laminates, then both were combined to obtain a prepreg laminate having a lamination structure $[0]_{20}$. By using an ordinary vacuum autoclave molding method, molding was performed under a pressure of 0.59 MPa and a condition of 180° C. for two hours. The obtained molded material (FRP) was cut into a size of 12.7 mm in width×304.8 mm in length to obtain a test specimen of interlaminar fracture toughness mode I (GIc).

By using a test method for double cantilever beam interlaminar fracture toughness (DCB method) as the testing method of the GIc, a pre-crack (initial crack) of 12.7 mm was allowed to be generated from the tip of the release sheet, and then a test for promoting the cracking was performed. The test was terminated when the length of the promoted cracking reached 127 mm from the tip of the pre-crack. The crosshead speed of the test specimen tensile testing machine was set as 12.7 mm/min, and the measurement was performed with n=5.

The length of the promoted cracking was measured from both end faces of the test specimen by using a microscope, and the load and the crack opening displacement were measured to calculate the GIc.

[Interlaminar Fracture Toughness Mode II (GIIc)]

The obtained prepreg was cut into a predetermined size, and then the cut piece of the prepreg was laminated to prepare two laminates laminated with 10 layers in a 0° direction. In order to generate an initial crack, a release sheet was sandwiched between the two laminates, then both were combined to obtain a prepreg laminate having a lamination structure $[0]_{20}$. By using an ordinary vacuum autoclave molding method, molding was performed under a pressure of 0.59 MPa and a condition of 180° C. for two hours. The obtained molded material (fiber reinforced composite material) was cut into a size of 12.7 mm in width×304.8 mm in length to obtain a test specimen of interlaminar fracture toughness mode II (GIIc). By using the test specimen, a GIIc test was performed.

As the GIIc test method, an ENF test (end notched flexure test) in which three-point flexural load is applied was performed. The distance between the fulcrums was set as 101.6 mm. The test specimen was placed so that the tip of the sheet prepared by a PTFE sheet having a thickness of 25 μm is in the distance of 38.1 mm from the fulcrum, and a flexural load was applied onto the test specimen at a speed of 2.54 mm/min to generate an initial crack.

After that, the test specimen was placed so that the tip of the crack is in the distance of 25.4 mm from the fulcrum, and a flexural load was applied onto the test specimen at a speed of 12.7 mm/min to perform the test. In the same manner, the test was performed three times, and the GIIc in each test was calculated from the load-stroke of each flexural test, then the average value was calculated.

In the tip of the crack, the measurement was performed from both end faces of the test specimen by using a microscope. The measurement of the GIIc test was performed by the test specimen with n=5.

[Volume Resistivity in the Z Direction]

In the present invention, as to the conductivity of the FRP, the volume resistivity in the Z direction (thickness direction) was measured by using a digital ohmmeter (AX-114N manufactured by ADEX). The volume resistivity means specific resistance of the given material. The volume resistivity ρ in the Z direction of the material is calculated by the following equation.

$$\rho = RA/L$$

R: electric resistance (Ω) of the uniform test specimen from a material,
L: thickness (m) of the test specimen, and
A: cross-sectional area ($m^2$) of the test specimen.

In the present invention, the volume resistance was measured only in the Z direction (penetrated the thickness of the FRP). The thickness is usually taken into consideration in the calculation, therefore, the value becomes "volume" resistivity in all cases.

[Preparation Method of a Specimen for Measurement of Volume Resistivity in the Z Direction]

The prepreg was cut, and the cut piece of the prepreg was laminated to obtain a laminate having a lamination structure $[+45/0/-45/90]_{2s}$. By using a vacuum autoclave molding method, the molding was performed under a pressure of 0.59 MPa and a condition of 180° C. for two hours. The obtained molded material was cut into a size of 40 mm in width×40 mm in length, the polishing on the surface of the molded material was performed until the carbon fibers were exposed by using a sandpaper, and finally surface finishing was performed by using a sandpaper of No. 2000 to obtain a test specimen. The obtained test specimen was sandwiched between the electrodes each of which had a size of 50 mm in width×50 mm in length and onto which gold plating had been applied, a load of 0.06 MPa was applied on the test specimen, and the resistance value in the Z direction was measured by using a digital ohmmeter to determine the volume resistivity from the above equation.

[Water Absorption]

The prepreg was cut into a size of 100×100 mm, and the mass (W1) was measured. After that, the prepreg was sunk into water in a desiccator. The pressure inside the desiccator was reduced to 10 kPa or lower to replace the air inside the prepreg with water. The prepreg was taken out from the water, the water on the surface was wiped off, and the mass (W2) of the prepreg was measured. The water absorption was calculated from these measured values by using the following equation:

Water absorption (%)=[(W2−W1)/W1]×100

W1: mass (g) of prepreg, and
W2: mass (g) of prepreg after water absorption.

[Storage Stability at Room Temperature]

A prepreg was stored at a temperature of 26.7° C. and a humidity of 65% for 10 days, and then the prepreg was cut and the cut piece of the prepreg was laminated into a metal mold to evaluate the storage stability. The evaluation results were expressed according to the following standard (○ to x).

○: The prepreg sufficiently follows even in being laminated into a metal mold, and shows almost the same handling property as that immediately after the production.

Δ: Curing reaction of the prepreg proceeds, and the tackiness and draping property are lowered, however, the prepreg is at a level with no problem to be used even in being laminated into a metal mold.

x: Curing reaction of the prepreg proceeds, the tackiness and draping property are significantly lowered, and the prepreg is in a state in which the lamination into a metal mold is difficult.

[Tackiness]

The tackiness of the prepreg was measured by the following method using a tacking tester TAC-II (RHESCA CO., LTD.). As to the testing method, a prepreg was set on a test stage maintained at 27° C., and an initial load of 100 gf was applied on the prepreg by a tack probe with φ5 maintained at 27° C., and the maximum load was determined when the tack probe was released from the prepreg at a test speed of 10 mm/sec.

The tack probe test was performed respectively for a prepreg immediately after the production, and for a prepreg after the storing at a temperature of 26.7° C. and a humidity of 65% for 10 days. The evaluation results were expressed according to the following standard (○ to x).

○: The load immediately after the production is 200 gf or more, and the tack retention after the storing for 10 days is 50% or more to less than 100%.

Δ: The load immediately after the production is 200 gf or more, and the tack retention after the storing for 10 days is 25% or more to less than 50%.

x: The load immediately after the production is 200 gf or more, and the tack retention after the storing for 10 days is 0% or more to less than 25%.

[Draping Property]

The draping property of the prepreg was evaluated by the following test in accordance with ASTM D 1388. A prepreg was cut in the 90° direction to the 0° direction of fiber, and the draping property (flexural rigidity, mg*cm) at an inclination angle of 41.5° was evaluated. The evaluation was performed respectively for a prepreg immediately after the production, and for a prepreg after the storing at a temperature of 26.7° C. and a humidity of 65% for the predetermined period of time. The evaluation results were expressed according to the following standard (○ to x).

○: The draping property even after the lapse of 20 days remains the same as that immediately after the production.

Δ: The draping property even after the lapse of 10 days remains the same as that immediately after the production. (The lowering of the draping property was slightly observed from the 10 days later.)

x: The draping property after the lapse of 10 days is lower than that immediately after the production, and the prepreg is at a level with problems to be used.

Examples 1 and 2

In the proportions described in Table 1, a thermoplastic resin was dissolved into an epoxy resin at 120° C. by using a stirrer. After that, the temperature was lowered to 80° C., conductive particles were added, and the resultant was mixed for 30 minutes to prepare an epoxy resin composition [A].

In the proportions described in Table 1, 10 parts by mass of Ultem 1000-1000 was dissolved into an epoxy resin at 120° C. by using a stirrer. After that, the temperature was lowered to 80° C., the remained thermoplastic resin and a curing agent were added, and the resultant was mixed for 30 minutes to prepare an epoxy resin composition [B].

The epoxy resin composition [A] and the epoxy resin composition [B] were respectively coated on a release film by using a film coater, and a resin [A] sheet and a resin [B] sheet, each of which has the weight described in Table 1, were obtained.

Next, the above-mentioned carbon fiber strand was supplied between two resin [B] sheets and uniformly arranged in one direction [weight (190 g/m$^2$)] to prepare the carbon fiber strand in a sheet shape, and then the resultant was pressurized and heated at 130° C. by using a roller to obtain a primary prepreg.

Next, the primary prepreg was supplied between two resin [A] sheets, and pressurized and heated at 70° C. by using a roller, then the resultant was wound onto a roll to obtain a prepreg. The content of the resin to the whole prepreg was 35% by mass. Various performances of the obtained prepreg are shown in Table 1.

In the prepregs obtained in Examples 1 and 2, the conductive particles are dispersed on the surface of the prepreg. Therefore, the conductivity of the FRP to be prepared by the laminating and curing of the prepreg was sufficiently high.

Comparative Examples 1 and 2

In the proportions described in Table 1, a curing agent was added into an epoxy resin at 80° C., and the resultant was mixed for 30 minutes by using a stirrer to prepare an epoxy resin composition [B]. Further, into the epoxy resin composition [B], the thermoplastic resin was not added. In addition, in the proportions described in Table 1, the epoxy resin composition [A] was prepared in the same manner as in Example 1. A prepreg was produced in the same manner as in Example 1, and various performances of the obtained prepreg are shown in Table 1.

A thermoplastic resin was not added into the epoxy resin composition [B], therefore, in the prepregs obtained in Comparative Examples 1 and 2, the conductive particles were sunk in the inner layer of the prepreg. Therefore, in the FRP prepared by the laminating and curing of the obtained prepreg, the volume resistivity was higher and the conductivity was lower as compared with those in Example 1 even in Comparative Example 2 in which conductive particles had been added in the double amount. Further, in Comparative Examples 1 and 2, the impact resistance and toughness of the FRP were also low.

On the other hand, in Examples 1 and 2, by the existence of the thermoplastic resin, the lowest viscosity of the resin composition with which the primary prepreg had been impregnated was higher as compared with that in Comparative Examples 1 and 2. Therefore, the conductive particles were hardly sunk in the inner layer of the prepreg. Therefore, in the FRP prepared by the laminating and curing of the prepreg, the conductive particles largely remained in the resin layer (derived from the surface layer of the prepreg and the resin layer of the primary prepreg) of the FRP, and served as a conductive bridge between the reinforcing fiber layers (derived from each of the reinforcing fiber layers of the prepreg laminated). Therefore, in the obtained FRP, the volume resistivity in the thickness direction was low and the conductivity was high. Further, in Examples 1 and 2, the impact resistance and toughness of the FRP were also high.

Examples 3 to 5

The prepreg was produced in the same manner as in Example 1 except that the thermoplastic resin used in the epoxy resin composition [A] and thermoplastic resin [B] was changed as described in Table 1. Various performances of the obtained prepreg are shown in Table 1.

Even in Examples 3 to 5 in which the kind of the thermoplastic resin was changed, in the same manner as in Examples 1 and 2, the lowest viscosity of the resin composition with which the primary prepreg that is an inner layer of the prepreg had been impregnated was higher by the existence of the thermoplastic resin, as compared with that in Comparative Examples 1 and 2. Therefore, the conductive particles were hardly sunk in the inner layer of the prepreg. Therefore, in the FRP prepared by the laminating and curing of the prepreg, the conductive particles largely remained in the resin layer of the FRP, and served as a conductive bridge between the reinforcing fiber layers. Therefore, in the obtained FRP, the volume resistivity in the thickness direction was low and the conductivity was high. Further, the impact resistance and toughness of the obtained FRP were also high.

TABLE 1

| Resin composition [parts by mass] | | | Example 1 | Example 2 | Comp. Ex. 1 | Comp. Ex. 2 | Example 3 | Example 4 | Example 5 |
|---|---|---|---|---|---|---|---|---|---|
| Epoxy resin composition A (surface layer) | Epoxy resin | MY0600 | 100 | 100 | 100 | 100 | 100 | 100 | 100 |
| | Curing agent | 3,3-DDS | | | | | | | |
| | Thermoplastic resin | Ultem1000-1000 | 30 | 30 | 30 | 30 | | | 15 |
| | | UDEL | | | | | 30 | | |
| | | PES5003P | | | | | | 30 | 15 |
| | | TR-55 | | | | | | | |
| | Conductive particle | Carbon black | 7 | 14 | 7 | 14 | 7 | 7 | 7 |
| | | VGCF | | | | | | | |
| | | Expanded graphite | | | | | | | |
| | | Copper powder | | | | | | | |
| | Weight of resin A sheet on one side [g/m$^2$] | | 10.2 | 10.2 | 10.2 | 10.2 | 10.2 | 10.2 | 10.2 |
| Epoxy resin composition B (inner layer) | Epoxy resin | MY0600 | 35 | 35 | 35 | 35 | 35 | 35 | 35 |
| | | MY0610 | | | | | | | |
| | | MY0510 | | | | | | | |
| | | ELM100 | | | | | | | |
| | | MY721 | 65 | 65 | 65 | 65 | 65 | 65 | 65 |
| | | MY725 | | | | | | | |
| | | jER828 | | | | | | | |
| | Curing agent | 3,3-DDS | 65 | 65 | 65 | 65 | 65 | 65 | 65 |
| | Thermoplastic resin | Ultem1000-1000 | 30 | 30 | | | | | 15 |
| | | UDEL | | | | | 30 | | |
| | | PES5003P | | | | | | 30 | 15 |
| | | TR-55 | | | | | | | |
| | | TR-90 | | | | | | | |
| | Conductive particle | Carbon black | | | | | | | |
| | | VGCF | | | | | | | |
| | | Expanded graphite | | | | | | | |
| | | Copper powder | | | | | | | |
| | Lowest resin viscosity [Poise] | | 100 | 100 | <1 | <1 | 100 | 100 | 100 |
| | Weight of resin B sheet on one side [g/m$^2$] | | 40 | 40 | 40 | 40 | 40 | 40 | 40 |
| Addition amount of conductive particles to the whole matrix resin [% by mass] | | | 1.1 | 2.0 | 1.1 | 2.0 | 1.1 | 1.1 | 1.1 |
| Performance of CFRP | | | | | | | | | |
| Volume resistivity [Ω · cm] | | | 30 | 10 | 100 | 50 | 30 | 30 | 30 |
| CAI (compression strength after impact) [MPa] | | | 230 | 230 | 140 | 140 | 220 | 230 | 230 |
| GIc (interlaminar fracture toughness mode I) [kJ/m$^2$] | | | 0.39 | 0.39 | 0.18 | 0.18 | 0.36 | 0.38 | 0.37 |
| GIIc (interlaminar fracture toughness mode II) [kJ/m$^2$] | | | 0.97 | 0.97 | 0.65 | 0.65 | 0.92 | 0.99 | 0.96 |

Examples 6 to 11

In the proportions described in Table 2, 10 parts by mass of an epoxy resin-soluble thermoplastic resin (Ultem 1000-1000) was dissolved into an epoxy resin at 120° C. by using a stirrer. After that, the temperature was lowered to 80° C., a curing agent, the remained epoxy resin-soluble thermoplastic resin, and an epoxy resin-insoluble thermoplastic resin (TR-55) were added, and the resultant was mixed for 30 minutes to prepare an epoxy resin composition [B]. The epoxy resin composition [A] was prepared in the same manner as in Example 1 except that the addition amount of the conductive particles was changed. A prepreg was produced in the same manner as in Example 1, and performances of the obtained prepreg are shown in Table 2.

In the prepregs obtained in Examples 6 to 11, the draping property after the prepreg was stored at a temperature of 26.7° C. and a humidity of 65% for 10 days remained unchanged as compared with that immediately after the production, and the tackiness maintained 50% or more, therefore the storage stability was excellent. In addition, in the obtained FRP, the volume resistivity in the thickness direction was low and the conductivity was high. The impact resistance and toughness of the obtained FRP were also high.

Comparative Example 3

A prepreg was produced in the same manner as in Example 6 except that the conductive particles were not added into the epoxy resin composition [A]. Various performances of the obtained prepreg are shown in Table 2.

Comparative Examples 4 and 5

As to the epoxy resin composition [B], in the proportions described in Table 2, 10 parts by mass of an epoxy resin-soluble thermoplastic resin (Ultem 1000-1000) was dissolved into an epoxy resin at 120° C. by using a stirrer. After that, the temperature was lowered to 80° C., a curing agent, the remained epoxy resin-soluble thermoplastic resin, an epoxy resin-insoluble thermoplastic resin (TR-55), and conductive particles were added, and the resultant was mixed for 30 minutes to prepare the epoxy resin composition [B]. A thermoplastic resin was dissolved into an epoxy resin at 120° C. by using a stirrer to prepare an epoxy resin composition [A]. Further, into the epoxy resin composition [A], conductive particles were not added. After that, a prepreg was produced in the same manner as in Example 1, and various performances of the obtained prepreg are shown in Table 2.

Example 12

In the proportions described in Table 2, 10 parts by mass of an epoxy resin-soluble thermoplastic resin (Ultem 1000-1000) was dissolved into an epoxy resin at 120° C. by using a stirrer. After that, the temperature was lowered to 80° C., a curing agent, the remained epoxy resin-soluble thermoplastic resin, an epoxy resin-insoluble thermoplastic resin (TR-55), and conductive particles were added, and the resultant was mixed for 30 minutes to prepare an epoxy resin composition [B]. The epoxy resin composition [A] was prepared in the same manner as in Example 1 except that the addition amount of the conductive particles was changed to the proportions described in Table 2. After that, a prepreg was produced in the same manner as in Example 1, and various performances of the obtained prepreg are shown in Table 2.

In Comparative Example 3 in which conductive particles were not added, an insoluble thermoplastic resin (TR-55) was distributed between reinforcing fiber layers of the FRP, and an insulating layer was formed in the resin layer of the FRP. Therefore, in the obtained FRP, the volume resistivity in the thickness direction was high and the conductivity was low.

On the other hand, in Examples 6 to 11, by the addition of conductive particles into the surface layer of the prepreg, the conductive particles were dispersed between the reinforcing fiber layers (resin layer) of the FRP, and served as a conductive bridge in the thickness direction between the reinforcing fiber layers. As a result, in spite of the existence of the insoluble thermoplastic resin (TR-55) in the resin layer, the volume resistivity was low and the conductivity was high in the obtained FRP.

In Comparative Examples 4 and 5, into the inner layer of the prepreg, conductive particles that are fine solid particles were added in a large amount (3 parts by mass, and 6 parts by mass, respectively, based on 100 parts by mass of the epoxy resin contained in the epoxy resin composition [B]), in addition to a thermoplastic resin. Therefore, the viscosity of the epoxy resin composition [B] became high, and the handling property was deteriorated, for example, the resin impregnation property of the prepreg was deteriorated, and the value of GIc of the obtained FRP was also lowered. Further, in the FRP obtained in Comparative Examples 4 and 5, the volume resistivity was higher, and the conductivity was lower as compared with the cases (Examples 9 and 10) in which conductive particles were contained in an epoxy resin composition [A] so that the proportion of the conductive particles to the whole matrix resin was the same degree.

In Example 12, conductive particles were added into both epoxy resin compositions [A] and [B]. As a result, the conductivity of the obtained FRP was slightly lowered as compared with the case (Example 9) in which conductive particles were added only into the epoxy resin composition [A] so that the addition amount to the whole matrix resin was the same degree, however, was sufficiently higher as compared with that in Comparative Examples 4 and 5.

TABLE 2

| Resin composition [parts by mass] | | | Example 6 | Example 7 | Example 8 | Example 9 | Example 10 |
|---|---|---|---|---|---|---|---|
| Epoxy resin composition A (surface layer) | Epoxy resin | MY0600 | 100 | 100 | 100 | 100 | 100 |
| | Curing agent | 3,3-DDS | | | | | |
| | Thermoplastic resin | Ultem1000-1000 | 30 | 30 | 30 | 30 | 30 |
| | | UDEL | | | | | |
| | | PES5003P | | | | | |
| | | TR-55 | | | | | |
| | Conductive particle | Carbon black | 0.2 | 1 | 3 | 7 | 14 |
| | | VGCF | | | | | |
| | | Expanded graphite | | | | | |
| | | Copper powder | | | | | |
| | Weight of resin A sheet on one side [g/m$^2$] | | 10.2 | 10.2 | 10.2 | 10.2 | 10.2 |
| Epoxy resin composition | Epoxy resin | MY0600 | 35 | 35 | 35 | 35 | 35 |
| | | MY0610 | | | | | |

TABLE 2-continued

| | | | | | | | |
|---|---|---|---|---|---|---|---|
| B (inner layer) | | MY0510 | | | | | |
| | | ELM100 | | | | | |
| | | MY721 | 65 | 65 | 65 | 65 | 65 |
| | | MY725 | | | | | |
| | | jER828 | | | | | |
| | Curing agent | 3,3-DDS | 65 | 65 | 65 | 65 | 65 |
| | Thermoplastic resin | Ultem1000-1000 | 32 | 32 | 32 | 32 | 32 |
| | | UDEL | | | | | |
| | | PES5003P | | | | | |
| | | TR-55 | 42 | 42 | 42 | 42 | 42 |
| | | TR-90 | | | | | |
| | Conductive particle | Carbon black | | | | | |
| | | VGCF | | | | | |
| | | Expanded graphite | | | | | |
| | | Copper powder | | | | | |
| | Lowest resin viscosity [Poise] | | 300 | 300 | 300 | 300 | 300 |
| | Weight of resin B sheet on one side [g/m²] | | 40 | 40 | 40 | 40 | 40 |
| | Addition amount of conductive particles to the whole matrix resin [% by mass] | | 0.03 | 0.15 | 0.46 | 1.1 | 2.0 |
| Performance of CFRP | | | | | | | |
| | Volume resistivity [Ω·cm] | | 3000 | 2000 | 1000 | 300 | 100 |
| | CAI (compression strength after impact) [MPa] | | 350 | 340 | 340 | 340 | 330 |
| | GIc (interlaminar fracture toughness mode I) [kJ/m²] | | 0.46 | 0.46 | 0.46 | 0.46 | 0.44 |
| | GIIc (interlaminar fracture toughness mode II) [kJ/m²] | | 2.3 | 2.2 | 2.2 | 2.2 | 2.1 |

| Resin composition [parts by mass] | | | Example 11 | Comp. Ex. 3 | Comp. Ex. 4 | Comp. Ex. 5 | Example 12 |
|---|---|---|---|---|---|---|---|
| Epoxy resin composition A (surface layer) | Epoxy resin | MY0600 | 100 | 100 | 100 | 100 | 100 |
| | Curing agent | 3,3-DDS | | | | | |
| | Thermoplastic resin | Ultem1000-1000 | 30 | 30 | 30 | 30 | 30 |
| | | UDEL | | | | | |
| | | PES5003P | | | | | |
| | | TR-55 | | | | | |
| | Conductive particle | Carbon black | 19.9 | | | | 3 |
| | | VGCF | | | | | |
| | | Expanded graphite | | | | | |
| | | Copper powder | | | | | |
| | Weight of resin A sheet on one side [g/m²] | | 10.2 | 10.2 | 10.2 | 10.2 | 10.2 |
| Epoxy resin composition B (inner layer) | Epoxy resin | MY0600 | 35 | 35 | 35 | 35 | 35 |
| | | MY0610 | | | | | |
| | | MY0510 | | | | | |
| | | ELM100 | | | | | |
| | | MY721 | 65 | 65 | 65 | 65 | 65 |
| | | MY725 | | | | | |
| | | jER828 | | | | | |
| | Curing agent | 3,3-DDS | 65 | 65 | 65 | 65 | 65 |
| | Thermoplastic resin | Ultem1000-1000 | 32 | 32 | 32 | 32 | 32 |
| | | UDEL | | | | | |
| | | PES5003P | | | | | |
| | | TR-55 | 42 | 42 | 42 | 42 | 42 |
| | | TR-90 | | | | | |
| | Conductive particle | Carbon black | | | 3 | 6 | 1.5 |
| | | VGCF | | | | | |
| | | Expanded graphite | | | | | |
| | | Copper powder | | | | | |
| | Lowest resin viscosity [Poise] | | 300 | 300 | 500 | 800 | 350 |
| | Weight of resin B sheet on one side [g/m²] | | 40 | 40 | 40 | 40 | 40 |
| | Addition amount of conductive particles to the whole matrix resin [% by mass] | | 2.7 | 0 | 1.0 | 2.0 | 1.0 |
| Performance of CFRP | | | | | | | |
| | Volume resistivity [Ω·cm] | | 40 | 4000 | 1500 | 1000 | 800 |
| | CAI (compression strength after impact) [MPa] | | 310 | 350 | 330 | 320 | 330 |
| | GIc (interlaminar fracture toughness mode I) [kJ/m²] | | 0.39 | 0.46 | 0.44 | 0.42 | 0.44 |
| | GIIc (interlaminar fracture toughness mode II) [kJ/m²] | | 2.0 | 2.3 | 2.1 | 2.1 | 2.1 |

Examples 13 and 14

A prepreg was produced in the same manner as in Example 6 except that the kind of the conductive particles was changed from carbon black to VGCF and the addition amount was changed to the addition amount described in Table 3. Various performances of the obtained prepreg are shown in Table 3.

Comparative Example 6

A prepreg was produced in the same manner as in Comparative Example 4 except that the kind of the conductive particles was changed from carbon black to VGCF. Various performances of the obtained prepreg are shown in Table 3.

TABLE 3

| Resin composition [parts by mass] | | | Example 13 | Example 14 | Comp. Ex. 6 |
|---|---|---|---|---|---|
| Epoxy resin composition A (surface layer) | Epoxy resin | MY0600 | 100 | 100 | 100 |
| | Curing agent | 3,3-DDS | | | |
| | Thermoplastic resin | Ultem1000-1000 | 30 | 30 | 30 |
| | | UDEL | | | |
| | | PES5003P | | | |
| | | TR-55 | | | |
| | Conductive particle | Carbon black | | | |
| | | VGCF | 7 | 14 | |
| | | Expanded graphite | | | |
| | | Copper powder | | | |
| | Weight of resin A sheet on one side [g/m$^2$] | | 10.2 | 10.2 | 10.2 |
| Epoxy resin composition B (inner layer) | Epoxy resin | MY0600 | 35 | 35 | 35 |
| | | MY0610 | | | |
| | | MY0510 | | | |
| | | ELM100 | | | |
| | | MY721 | 65 | 65 | 65 |
| | | MY725 | | | |
| | | jER828 | | | |
| | Curing agent | 3,3-DDS | 65 | 65 | 65 |
| | Thermoplastic resin | Ultem1000-1000 | 32 | 32 | 32 |
| | | UDEL | | | |
| | | PES5003P | | | |
| | | TR-55 | 42 | 42 | 42 |
| | | TR-90 | | | |
| | Conductive particle | Carbon black | | | |
| | | VGCF | | | 3 |
| | | Expanded graphite | | | |
| | | Copper powder | | | |
| | Lowest resin viscosity [Poise] | | 300 | 300 | 500 |
| | Weight of resin B sheet on one side [g/m$^2$] | | 40 | 40 | 40 |
| | Addition amount of conductive particles to the whole matrix resin [% by mass] | | 1.1 | 2.0 | 1.0 |
| Performance of CFRP | | | | | |
| Volume resistivity [Ω · cm] | | | 2000 | 1000 | 3000 |
| CAI (compression strength after impact) [MPa] | | | 345 | 340 | 345 |
| GIc (interlaminar fracture toughness mode I) [kJ/m$^2$] | | | 0.51 | 0.49 | 0.49 |
| GIIc (interlaminar fracture toughness mode II) [kJ/m$^2$] | | | 2.3 | 7.9 | 2.3 |

Examples 15 and 16

A prepreg was produced in the same manner as in Example 6 except that the kind of the conductive particles was changed from carbon black to expanded graphite and the addition amount was changed to the addition amount described in Table 4. Various performances of the obtained prepreg are shown in Table 4.

Comparative Example 7

A prepreg was produced in the same manner as in Comparative Example 4 except that the kind of the conductive particles was changed from carbon black to expanded graphite. Various performances of the obtained prepreg are shown in Table 4.

TABLE 4

| Resin composition [parts by mass] | | | Example 15 | Example 16 | Comp. Ex. 7 |
|---|---|---|---|---|---|
| Epoxy resin composition | Epoxy resin | MY0600 | 100 | 100 | 100 |
| | Curing agent | 3,3-DDS | | | |

TABLE 4-continued

| Resin composition [parts by mass] | | | Example 15 | Example 16 | Comp. Ex. 7 |
|---|---|---|---|---|---|
| A (surface layer) | Thermoplastic resin | Ultem1000-1000 | 30 | 30 | 30 |
| | | UDEL | | | |
| | | PES5003P | | | |
| | | TR-55 | | | |
| | Conductive particle | Carbon black | | | |
| | | VGCF | 7 | 14 | |
| | | Expanded graphite | | | |
| | | Copper powder | | | |
| | Weight of resin A sheet on one side [g/m²] | | 10.2 | 10.2 | 10.2 |
| Epoxy resin composition B (inner layer) | Epoxy resin | MY0600 | 35 | 35 | 35 |
| | | MY0610 | | | |
| | | MY0510 | | | |
| | | ELM100 | | | |
| | | MY721 | 65 | 65 | 65 |
| | | MY725 | | | |
| | | jER828 | | | |
| | Curing agent | 3,3-DDS | 65 | 65 | 65 |
| | Thermoplastic resin | Ultem1000-1000 | 32 | 32 | 32 |
| | | UDEL | | | |
| | | PES5003P | | | |
| | | TR-55 | 42 | 42 | 42 |
| | | TR-90 | | | |
| | Conductive particle | Carbon black | | | |
| | | VGCF | | | |
| | | Expanded graphite | | | 3 |
| | | Copper powder | | | |
| | Lowest resin viscosity [Poise] | | 300 | 300 | 500 |
| | Weight of resin B sheet on one side [g/m²] | | 40 | 40 | 40 |
| | Addition amount of conductive particles to the whole matrix resin [% by mass] | | 1.1 | 2.0 | 1.0 |
| Performance of CFRP | | | | | |
| Volume resistivity [Ω · cm] | | | 2000 | 1000 | 3000 |
| CAI (compression strength after impact) [MPa] | | | 340 | 330 | 330 |
| GIc (interlaminar fracture toughness mode I) [kJ/m²] | | | 0.40 | 0.37 | 0.39 |
| GIIc (interlaminar fracture toughness mode II) [kJ/m²] | | | 2.2 | 2.0 | 2.2 |

Examples 17 and 18

A prepreg was produced in the same manner as in Example 6 except that the kind of the conductive particles was changed from carbon black to copper powder and the addition amount was changed to the addition amount described in Table 5. Various performances of the obtained prepreg are shown in Table 5.

Comparative Example 8

A prepreg was produced in the same manner as in Comparative Example 4 except that the kind of the conductive particles was changed from carbon black to copper powder. Various performances of the obtained prepreg are shown in Table 5.

TABLE 5

| Resin composition [parts by mass] | | | Example 17 | Example 18 | Comp. Ex. 8 |
|---|---|---|---|---|---|
| Epoxy resin composition A (surface layer) | Epoxy resin | MY0600 | 100 | 100 | 100 |
| | Curing agent | 3,3-DDS | | | |
| | Thermoplastic resin | Ultem1000-1000 | 30 | 30 | 30 |
| | | UDEL | | | |
| | | PES5003P | | | |
| | | TR-55 | | | |
| | Conductive particle | Carbon black | | | |
| | | VGCF | | | |
| | | Expanded graphite | | | |
| | | Copper powder | 7 | 14 | |
| | Weight of resin A sheet on one side [g/m²] | | 10.2 | 10.2 | 10.2 |
| Epoxy resin composition B (inner layer) | Epoxy resin | MY0600 | 35 | 35 | 35 |
| | | MY0610 | | | |
| | | MY0510 | | | |
| | | ELM100 | | | |
| | | MY721 | 65 | 65 | 65 |
| | | MY725 | | | |
| | | jER828 | | | |
| | Curing agent | 3,3-DDS | 65 | 65 | 65 |
| | Thermoplastic resin | Ultem1000-1000 | 32 | 32 | 32 |
| | | UDEL | | | |
| | | PES5003P | | | |
| | | TR-55 | 42 | 42 | 42 |
| | | TR-90 | | | |

TABLE 5-continued

| Resin composition [parts by mass] | | Example 17 | Example 18 | Comp. Ex. 8 |
|---|---|---|---|---|
| Conductive particle | Carbon black | | | |
| | VGCF | | | |
| | Expanded graphite | | | |
| | Copper powder | | | 3 |
| Lowest resin viscosity [Poise] | | 300 | 300 | 450 |
| Weight of resin B sheet on one side [g/m$^2$] | | 40 | 40 | 40 |
| Addition amount of conductive particles to the whole matrix resin [% by mass] | | 1.1 | 2.0 | 1.0 |
| Performance of CFRP | | | | |
| Volume resistivity [Ω · cm] | | 1000 | 500 | 2000 |
| CAI (compression strength after impact) [MPa] | | 330 | 325 | 320 |
| GIc (interlaminar fracture toughness mode I) [kJ/m$^2$] | | 0.49 | 0.47 | 0.49 |
| GIIc (interlaminar fracture toughness mode II) [kJ/m$^2$] | | 2.2 | 2.1 | 2.2 |

Examples 19 to 24

A prepreg was produced in the same manner as in Example 9 except that the kind of the epoxy resin of the epoxy resin composition [B] was changed. Various performances of the obtained prepreg are shown in Table 6.

TABLE 6

| Resin composition [parts by mass] | | | Example 19 | Example 20 | Example 21 | Example 22 | Example 23 | Example 24 |
|---|---|---|---|---|---|---|---|---|
| Epoxy resin composition A (surface layer) | Epoxy resin | MY0600 | 100 | 100 | 100 | 100 | 100 | 100 |
| | Curing agent | 3,3-DDS | | | | | | |
| | Thermoplastic resin | Ultem1000-1000 | 30 | 30 | 30 | 30 | 30 | 30 |
| | | UDEL | | | | | | |
| | | PES5003P | | | | | | |
| | | TR-55 | | | | | | |
| | Conductive particle | Carbon black | 7 | 7 | 7 | 7 | 7 | 7 |
| | | VGCF | | | | | | |
| | | Expanded graphite | | | | | | |
| | | Copper powder | | | | | | |
| | Weight of resin A sheet on one side [g/m$^2$] | | 10.2 | 10.2 | 10.2 | 10.2 | 10.2 | 10.2 |
| Epoxy resin composition B (inner layer) | Epoxy resin | MY0600 | 50 | | | | | |
| | | MY0610 | | | | | | |
| | | MY0510 | | 50 | 50 | | | |
| | | ELM100 | 30 | 30 | | 50 | | |
| | | MY721 | 20 | 20 | 20 | 20 | 50 | 20 |
| | | MY725 | | | | | | |
| | | jER828 | | | 30 | 30 | 50 | 80 |
| | Curing agent | 3,3-DDS | 65 | 65 | 65 | 65 | 65 | 65 |
| | Thermoplastic resin | Ultem1000-1000 | 32 | 32 | 32 | 32 | 32 | 32 |
| | | UDEL | | | | | | |
| | | PES5003P | | | | | | |
| | | TR-55 | 42 | 42 | 42 | 42 | 42 | 42 |
| | | TR-90 | | | | | | |
| | Conductive particle | Carbon black | | | | | | |
| | | VGCF | | | | | | |
| | | Expanded graphite | | | | | | |
| | | Copper powder | | | | | | |
| | Lowest resin viscosity [Poise] | | 200 | 200 | 150 | 100 | 400 | 100 |
| | Weight of resin B sheet on one side [g/m$^2$] | | 40 | 40 | 40 | 40 | 40 | 40 |
| Addition amount of conductive particles to the whole matrix resin [% by mass] | | | 1.1 | 1.1 | 1.1 | 1.1 | 1.1 | 1.1 |
| Performance of CFRP | | | | | | | | |
| Volume resistivity [Ω · cm] | | | 300 | 300 | 300 | 300 | 300 | 300 |
| CAI (compression strength after impact) [MPa] | | | 350 | 320 | 320 | 300 | 290 | 280 |
| GIc (interlaminar fracture toughness mode I) [kJ/m$^2$] | | | 0.46 | 0.40 | 0.40 | 0.37 | 0.33 | 0.32 |
| GIIc (interlaminar fracture toughness mode II) [kJ/m$^2$] | | | 2.2 | 2.0 | 2.0 | 1.9 | 1.8 | 1.8 |

Example 25

A prepreg was produced in the same manner as in Example 9 except that the kind of the epoxy resin-insoluble thermoplastic resin of the epoxy resin composition [B] was changed from TR-55 to TR-90. Various performances of the obtained prepreg are shown in Table 7.

Example 26

A prepreg was produced in the same manner as in Example 9 except that the kinds of the epoxy resin of the epoxy resin composition [A] and epoxy resin composition [B] were changed from MY0600 and MY721 to MY0610 and MY725, respectively. Various performances of the obtained prepreg are shown in Table 7.

Example 27

A prepreg was produced in the same manner as in Example 12 except that the kinds of the epoxy resin of the epoxy resin composition [A] and epoxy resin composition [B] were changed from MY0600 and MY721 to MY0610 and MY725, respectively, and further the addition amount of the conductive fine particles was changed. Various performances of the obtained prepreg are shown in Table 7.

Examples 28 and 29

In the proportions described in Table 7, 10 parts by mass of an epoxy resin-soluble thermoplastic resin (Ultem 1000-1000) was dissolved into an epoxy resin at 120° C. by using a stirrer. After that, the temperature was lowered to 80° C., a curing agent, the remained epoxy resin-soluble thermoplastic resin, and an epoxy resin-insoluble thermoplastic resin (TR-55) were added, and the resultant was mixed for 30 minutes to prepare an epoxy resin composition [B]. In the proportions described in Table 7, 10 parts by mass of the epoxy resin-soluble thermoplastic resin (Ultem1000-1000) was dissolved into an epoxy resin at 120° C. by using a stirrer, and then the temperature was lowered to 80° C., conductive particles, a curing agent, the remained epoxy resin-soluble thermoplastic resin, and an epoxy resin-insoluble thermoplastic resin were added, and the resultant was mixed for 30 minutes to prepare an epoxy resin composition [A]. A prepreg was produced in the same manner as in Example 1, and various performances of the obtained prepreg are shown in Table 7.

In Examples 28 and 29, a curing agent was added into an epoxy resin composition [A] that is a surface layer of the prepreg, therefore, the maintenance rates of the draping property and tackiness of the obtained prepreg were lowered, and the storage stability at room temperature was slightly lowered as compared with that in Examples 6 to 11, however, the conductivity and impact resistance of the FRP were sufficient.

Examples 30 and 31

In the proportions described in Table 7, 7 parts by mass of an epoxy resin-soluble thermoplastic resin (Ultem 1000-1000) was dissolved into an epoxy resin at 120° C. by using a stirrer. After that, the temperature was lowered to 80° C., the remained epoxy resin-soluble thermoplastic resin and an epoxy resin-insoluble thermoplastic resin were added, and the resultant was mixed for 30 minutes to prepare an epoxy resin composition [B]. Further, into the epoxy resin composition [B], a curing agent was not added. In the proportions described in Table 7, all of the epoxy resin-soluble thermoplastic resin was dissolved into an epoxy resin at 120° C. by using a stirrer. After that, the temperature was lowered to 80° C., a curing agent, and conductive particles were added, and the resultant was mixed for 30 minutes to prepare an epoxy resin composition [A]. A prepreg was produced in the same manner as in Example 1, and various performances of the obtained prepreg are shown in Table 7.

In the prepregs obtained in Examples 30 and 31 in which a curing agent was not added into an epoxy resin composition [B], the conductive particles were dispersed on the surface of the prepreg as in Examples 1 and 2. Therefore, the conductivity was sufficiently high, and the impact resistance and toughness were also high in the FRP prepared by the laminating and curing of the obtained prepreg. In the prepregs obtained in Examples 30 and 31, the draping property and the tackiness were both excellent, and further, even after the prepreg was stored at a temperature of 26.7° C. and a humidity of 65% for 10 days, the draping property remained unchanged as compared with that immediately after the production, and the tackiness maintained 50% or more, therefore, the storage stability was excellent.

TABLE 7

| Resin composition [parts by mass] | | | Example 25 | Example 26 | Example 27 | Example 28 | Example 29 | Example 30 | Example 31 |
|---|---|---|---|---|---|---|---|---|---|
| Epoxy resin composition A (surface layer) | Epoxy resin | MY0600 | 100 | | | 100 | 100 | 100 | 100 |
| | | MY0610 | | 100 | 100 | | | | |
| | Curing agent | 3,3-DDS | | | | 50 | 50 | 142 | 170 |
| | Thermoplastic resin | Ultem1000-1000 | 30 | 30 | 30 | 25 | 25 | 15 | 7 |
| | | UDEL | | | | | | | |
| | | PES5003P | | | | | | | |
| | | TR-55 | | | | 30 | 30 | | |
| | Conductive particle | Carbon black | 7 | 7 | 7 | 5 | 10 | 7 | 7 |
| | | VGCF | | | | | | | |
| | | Expanded graphite | | | | | | | |
| | | Copper powder | | | | | | | |
| | Weight of resin A sheet on one side [g/m²] | | 10.2 | 10.2 | 10.2 | 20 | 20 | 20.2 | 20.2 |
| Epoxy resin composition B (inner layer) | Epoxy resin | MY0600 | 35 | | | 35 | 35 | 81 | 85 |
| | | MY0610 | | | 35 | | | | |
| | | MY0510 | | | | | | | |
| | | ELM100 | | | | | | | |
| | | MY721 | 65 | | | 65 | 65 | 19 | 15 |
| | | MY725 | | 65 | 65 | | | | |
| | | jER828 | | | | | | | |

TABLE 7-continued

| Resin composition [parts by mass] | | Example 25 | Example 26 | Example 27 | Example 28 | Example 29 | Example 30 | Example 31 |
|---|---|---|---|---|---|---|---|---|
| Curing agent | 3,3-DDS | 65 | 65 | 65 | 50 | 50 | | |
| Thermoplastic resin | Ultem1000-1000 | 32 | 32 | 32 | 25 | 25 | 39 | 33 |
| | UDEL | | | | | | | |
| | PES5003P | | | | | | | |
| | TR-55 | | 42 | 42 | 30 | 30 | 43 | 42 |
| | TR-90 | 42 | | | | | | |
| Conductive particle | Carbon black | | | | 3 | | | |
| | VGCF | | | | | | | |
| | Expanded graphite | | | | | | | |
| | Copper powder | | | | | | | |
| Lowest resin viscosity [Poise] | | 300 | 200 | 350 | 200 | 200 | 500 | 400 |
| Weight of resin B sheet on one side [g/m²] | | 40 | 40 | 40 | 30.2 | 30.2 | 30 | 30 |
| Addition amount of conductive particles to the whole matrix resin [% by mass] | | 1.1 | 1.1 | 2.0 | 0.9 | 1.9 | 1.0 | 0.9 |
| Performance of CFRP | | | | | | | | |
| Volume resistivity [Ω · cm] | | 300 | 300 | 100 | 300 | 100 | 100 | 100 |
| CAI (compression strength after impact) [MPa] | | 345 | 340 | 330 | 330 | 320 | 340 | 330 |
| GIc (interlaminar fracture toughness mode I) [kJ/m²] | | 0.45 | 0.46 | 0.44 | 0.46 | 0.44 | 0.46 | 0.46 |
| GIIc (interlaminar fracture toughness mode II) [kJ/m²] | | 2.1 | 2.2 | 2.1 | 2.2 | 2.1 | 2.2 | 2.2 |

Comparative Examples 9 to 11

In the proportions described in Table 8, 10 parts by mass of an epoxy resin-soluble thermoplastic resin (Ultem 1000-1000) was dissolved into an epoxy resin at 120° C. by using a stirrer. After that, the temperature was lowered to 80° C., a curing agent, the remained epoxy resin-soluble thermoplastic resin, an epoxy resin-insoluble thermoplastic resin (TR-55), and conductive particles were added, and the resultant was mixed for 30 minutes to prepare an epoxy resin composition. The epoxy resin composition was coated on a release film with the weight described in Table 8 by using a film coater, and a resin sheet was obtained. Next, the above-mentioned carbon fiber strand was uniformly arranged in one direction [weight (190 g/m²)] and supplied between two resin sheets, and pressurized and heated at 130° C. by using a roller, then the resultant was wound onto a roll to obtain a prepreg. The content of the resin composition to the whole prepreg was 35% by mass. Various performances of the obtained prepreg are shown in Table 8.

In Comparative Examples 9 to 11, a thermoplastic resin, conductive particles that are fine solid particles, and an epoxy resin, were added in a large amount, therefore, the viscosity of the resin composition became high. Therefore, the handling property was deteriorated, for example, the resin impregnation property of the prepreg was deteriorated. Further, the value of GIc of the obtained FRP was also low.

Further, the prepregs of Comparative Examples 9 to 11 were difficult to be used because the storage stability at room temperature, the tack retainability, and the draping property were significantly deteriorated by the curing reaction of a trifunctional glycidylamine type epoxy resin and 3,3'-DDS.

Further, in Comparative Examples 9 to 11, the conductive particles were mixed over the whole prepreg. Therefore, the content of the conductive particles sunk in the reinforcing fiber layer was larger as compared with the cases (Examples 9 and 10) in which the proportion of the conductive particles to the whole matrix resin was the same degree, and the conductive particles were contained only in the surface layer of the prepreg. Therefore, in the FRP prepared by the laminating and curing of the prepreg, the content of the conductive particles connecting reinforcing fiber layers with each other was decreased.

Therefore, in Comparative Examples 9 to 11, the value of the volume resistivity became higher as compared with that in Examples 9 and 10 in which conductive particles were added only in the surface layer of the prepreg.

TABLE 8

| Resin composition [parts by mass] | | Comp. Ex. 9 | Comp. Ex. 10 | Comp. Ex. 11 |
|---|---|---|---|---|
| Resin composition | Epoxy resin | MY0600 | 100 | 100 | 50 |
| | | MY0610 | | | |
| | | MY0510 | | | |
| | | ELM100 | | | |
| | | MY721 | | | 50 |
| | | MY725 | | | |
| | | jER828 | | | |
| | Curing agent | 3,3-DDS | 52 | 52 | 50 |
| | Thermoplastic resin | Ultem1000-1000 | 31 | 31 | 30 |
| | | UDEL | | | |
| | | PES5003P | | | |
| | | TR-55 | 32 | 32 | 32 |
| | | TR-90 | | | |
| | Conductive particle | Carbon black | 2.2 | 4.5 | 2.2 |
| | | VGCF | | | |
| | | Expanded graphite | | | |
| | | Copper powder | | | |

TABLE 8-continued

| Resin composition [parts by mass] | Comp. Ex. 9 | Comp. Ex. 10 | Comp. Ex. 11 |
|---|---|---|---|
| Lowest resin viscosity [Poise] | 1000 | 1500 | 1000 |
| Weight of resin B sheet on one side [g/m$^2$] | 50.2 | 50.2 | 50.2 |
| Addition amount of conductive particles to the whole matrix resin [% by mass] | 1.0 | 1.0 | 1.0 |
| Performance of CFRP | | | |
| Volume resistivity [Ω · cm] | 1000 | 500 | 1000 |
| CAI (compression strength after impact) [MPa] | 350 | 330 | 320 |
| GIc (interlaminar fracture toughness mode I) [kJ/m$^2$] | 0.44 | 0.42 | 0.39 |
| GIIc (interlaminar fracture toughness mode II) [kJ/m$^2$] | 2.3 | 2.1 | 1.8 |

Examples 32 and 33

In the proportions described in Table 9, an epoxy resin-soluble thermoplastic resin was dissolved into an epoxy resin at 120° C. by using a stirrer, and then the temperature was lowered to 80° C., conductive particles were added, and the resultant was mixed for 30 minutes to prepare an epoxy resin composition [A]. In the proportions described in Table 9, 10 parts by mass of an epoxy resin-soluble thermoplastic resin was dissolved into an epoxy resin at 120° C. by using a stirrer. After that, the temperature was lowered to 80° C., the remained epoxy resin-soluble thermoplastic resin, conductive particles, a curing agent, and an epoxy resin-insoluble thermoplastic resin were added, and the resultant was mixed for 30 minutes to prepare an epoxy resin composition [B]. A prepreg was produced in the same manner as in Example 1, and various performances of the obtained prepreg are shown in Table 9.

In the prepregs of Examples 32 and 33, by the existence of the conductive particles having a large particle diameter on the surface of the primary prepreg, the conductive particles were dispersed in the surface layer of the prepreg. Consequently, conductive particles were dispersed in the resin layer of the FRP, and served as a conductive bridge between the reinforcing fiber layers of the FRP, as a result, the conductivity was improved.

TABLE 9

| Resin composition [parts by mass] | | | Example 32 | Example 33 |
|---|---|---|---|---|
| Epoxy resin composition A (surface layer) | Epoxy resin | MY0600 | 50 | 50 |
| | | ELM100 | 50 | 50 |
| | | MY721 | | |
| | | jER828 | | |
| | Curing agent | 3,3-DDS | | |
| | | 4,4-DDS | | |
| | Thermoplastic resin | VW-10200RSFP | 30 | 30 |
| | | Ultrason E2020P | | |
| | | Ultem1000-1000 | | |
| | | ORGASOL1002D NAT | | |
| | | MX nylon | | |
| | Conductive particle | Dialead | | |
| | | GRANOC | | |
| | | Expanded graphite | | |
| | | Carbon black | 7 | 7 |
| | | VGCF | | |
| | 80° C. resin viscosity [Poise] | | 1500 | 1500 |
| | Weight of resin A sheet on one side [g/m$^2$] | | 10.2 | 10.2 |
| Epoxy resin composition B (inner layer) | Epoxy resin | MY0600 | 20 | 20 |
| | | ELM100 | 15 | 15 |
| | | MY721 | 65 | 65 |
| | | jER828 | | |
| | Curing agent | 3,3-DDS | 65 | 65 |
| | | 4,4-DDS | | |
| | Thermoplastic resin | VW-10200RSFP | 32 | 32 |
| | | Ultrason E2020P | | |
| | | Ultem1000-1000 | | |
| | | ORGASOL1002D NAT | 42 | 42 |
| | | MX nylon | | |
| | Conductive particle | Dialead | 6 | 14 |
| | | GRANOC | | |
| | | Expanded graphite | | |
| | | Carbon black | | |
| | | VGCF | | |
| | Lowest resin viscosity [Poise] | | 250 | 800 |
| | Weight of resin B sheet on one side [g/m$^2$] | | 40 | 40 |
| | Addition amount of conductive particles to the whole matrix resin [% by mass] | | 3.0 | 5.5 |
| Performance of CFRP | | | | |
| Volume resistivity [Ω · cm] | | | 70 | 40 |
| CAI (compression strength after impact) [MPa] | | | 300 | 290 |
| GIc (interlaminar fracture toughness mode I) [kJ/m$^2$] | | | 0.42 | 0.41 |
| GIIc (interlaminar fracture toughness mode II) [kJ/m$^2$] | | | 2.1 | 2.0 |

Comparative Examples 12 to 15

In the proportions described in Table 10, 10 parts by mass of an epoxy resin-soluble thermoplastic resin was dissolved into an epoxy resin at 120° C. by using a stirrer. After that, the temperature was lowered to 80° C., a curing agent, the remained epoxy resin-soluble thermoplastic resin, an epoxy resin-insoluble thermoplastic resin, and conductive particles were added, and the resultant was mixed for 30 minutes to prepare an epoxy resin composition. The epoxy resin composition was coated on a release film with the weight described in Table 10 by using a film coater, and a resin sheet was obtained.

Next, the above-mentioned carbon fiber strand was uniformly arranged in one direction [weight (190 g/m$^2$)] and supplied between two resin sheets, and pressurized and heated at 130° C. by using a roller, then the resultant was wound onto a roll to obtain a prepreg. The content of the resin composition to the whole prepreg was 35% by mass. Various performances of the obtained prepreg are shown in Table 10.

In Comparative Examples 12 to 15, conductive particles were added in a large amount of 10 to 20 parts by mass based on 100 parts by mass of the epoxy resin, in addition to a thermoplastic resin, as a result, the viscosity of the resin composition became high. Therefore, the handling property was deteriorated, for example, the resin impregnation property of the prepreg was deteriorated. Further, the value of GIc of the obtained FRP was also low.

Further, the prepregs of Comparative Examples 12 to 15 were difficult to be used because the storage stability at room temperature, the tack retainability, and the draping property were significantly deteriorated by the curing reaction of a trifunctional glycidylamine type epoxy resin and 3,3'-DDS.

Examples 34 and 35

In the proportions described in Table 11, an epoxy resin-soluble thermoplastic resin was dissolved into an epoxy resin at 120° C. by using a stirrer, and then the temperature was lowered to 80° C., a curing agent and conductive particles were added, and the resultant was mixed for 30 minutes to prepare an epoxy resin composition [A]. In the proportions described in Table 11, an epoxy resin-soluble thermoplastic resin was dissolved into an epoxy resin at 120° C. by using a stirrer, and then the temperature was lowered to 80° C., an epoxy resin-insoluble thermoplastic resin was added, and the resultant was mixed for 30 minutes to prepare an epoxy resin composition [B].

The epoxy resin composition [A] and the epoxy resin composition [B] were respectively coated on a release film by using a film coater, and a resin [A] sheet and a resin [B] sheet, each of which has the weight described in Table 11, were obtained.

Next, the above-mentioned carbon fiber strand was supplied between two resin [B] sheets and uniformly arranged in one direction [weight (190 g/m$^2$)] to prepare the carbon fiber strand in a sheet shape, and then the resultant was pressurized and heated at 140° C. by using a roller to obtain a primary prepreg.

The obtained primary prepreg was supplied between two resin [A] sheets, and pressurized and heated at 70° C. by using a roller, then the resultant was wound onto a roll to obtain a prepreg. The content of the resin composition to the whole prepreg was 35% by mass. Various performances of the obtained prepreg are shown in Table 11.

TABLE 10

| Resin composition [parts by mass] | | | Comp. Ex. 12 | Comp. Ex. 13 | Comp. Ex. 14 | Comp. Ex. 15 |
|---|---|---|---|---|---|---|
| Epoxy resin composition | Epoxy resin | MY0600 | 26 | 26 | 26 | 26 |
| | | ELM100 | 22 | 22 | 22 | 22 |
| | | MV721 | 52 | 52 | 52 | 52 |
| | | jER828 | | | | |
| | Curing agent | 3,3-DDS | 52 | 52 | 52 | 52 |
| | | 4,4-DDS | | | | |
| | Thermoplastic resin | VW-10200RSFP | 31 | 31 | 31 | 31 |
| | | Ultrason E2020P | | | | |
| | | Ultem1000-1000 | | | | |
| | | ORGASOL1002D NAT | 32 | 32 | 32 | 32 |
| | | MX nylon | | | | |
| | Conductive particle | Dialead | 10 | 20 | | |
| | | GRANOC | | | 10 | 20 |
| | | Expanded graphite | | | | |
| | | Carbon black | | | | |
| | | VGCF | | | | |
| Lowest resin viscosity [Poise] | | | 400 | 800 | 400 | 800 |
| Weight of resin sheet on one side [g/m$^2$] | | | 50.2 | 50.2 | 50.2 | 50.2 |
| Addition amount of conductive particles to the whole matrix resin [% by mass] | | | 1.0 | 2.0 | 1.0 | 2.0 |
| Performance of CFRP | | | | | | |
| Volume resistivity [Ω · cm] | | | 200 | 100 | 200 | 100 |
| CAI (compression strength after impact) [MPa] | | | 340 | 330 | 280 | 270 |
| GIc (interlaminar fracture toughness mode I) [kJ/m$^2$] | | | 0.44 | 0.42 | 0.385 | 0.32 |
| GIIc (interlaminar fracture toughness mode II) [kJ/m$^2$] | | | 2.28 | 2.1 | 2.0 | 1.9 |

TABLE 11

| Resin composition [parts by mass] | | | Example 34 | Example 35 |
|---|---|---|---|---|
| Epoxy resin composition A (surface layer) | Epoxy resin | MY0600 | 100 | 100 |
| | | MY0510 | | |
| | | ELM100 | | |
| | | MY721 | | |
| | | jER828 | | |
| | | jER154 | | |
| | Curing agent | 3,3-DDS | 140 | 140 |
| | | 4,4-DDS | | |
| | Thermoplastic resin | VW-10200RSFP | | |
| | | VW-10700RSFP | | |
| | | VW-30500RP | 25 | 25 |
| | | TR-55 | | |
| | Conductive particle | Carbon black | 3.5 | 7 |
| | | VGCF | | |
| | | Dialead | | |
| | | GRANOC | | |
| | Lowest resin viscosity [Poise] | | 1800 | 4500 |
| | Weight of resin A sheet on one side [g/m$^2$] | | 20.2 | 20.2 |
| Epoxy resin composition B (inner layer) | Epoxy resin | MY0600 | 50 | 50 |
| | | MY0510 | | |
| | | ELM100 | | |
| | | MY721 | 50 | 50 |
| | | jER828 | | |
| | | jER154 | | |
| | Curing agent | 3,3-DDS | | |
| | | 4,4-DDS | | |
| | Thermoplastic resin | VW-10200RSFP | | |
| | | VW-10700RSFP | | |
| | | VW-30500RP | 35 | 35 |
| | | TR-55 | 50 | 50 |
| | Conductive particle | Carbon black | | |
| | | VGCF | | |
| | | Dialead | | |
| | | GRANOC | | |
| | 80° C. resin viscosity [Poise] | | 300 | 300 |
| | Weight of resin B sheet on one side [g/m$^2$] | | 30 | 30 |
| | Addition amount of conductive particles to the whole matrix resin [% by mass] | | 0.5 | 1.0 |
| Performance of prepreg | | | | |
| Water absorption [%] | | | 3 | 3 |
| Storage stability at room temperature [○, Δ, X] | | | ○ | ○ |
| Tack retainability [○, Δ, X] | | | ○ | ○ |
| Draping property [○, Δ, X] | | | ○ | ○ |
| Performance of CFRP | | | | |
| Volume resistivity [Ω · cm] | | | 300 | 150 |

Examples 36 to 40

In the proportions described in Table 12, an epoxy resin-soluble thermoplastic resin was dissolved into an epoxy resin at 120° C. by using a stirrer, and then the temperature was lowered to 80° C., a curing agent, an epoxy resin-insoluble thermoplastic resin, and conductive particles were added, and the resultant was mixed for 30 minutes to prepare an epoxy resin composition [A]. In the proportions described in Table 12, an epoxy resin-soluble thermoplastic resin was dissolved into an epoxy resin at 120° C. by using a stirrer, and then the temperature was lowered to 80° C., an epoxy resin-insoluble thermoplastic resin, and conductive particles were added, and the resultant was mixed for 30 minutes to prepare an epoxy resin composition [B].

Next, the above-mentioned carbon fiber strand was supplied between two resin [B] sheets and uniformly arranged in one direction [weight (190 g/m$^2$)] to prepare the carbon fiber strand in a sheet shape, and then the resultant was pressurized and heated at 140° C. by using a roller to obtain a primary prepreg.

Next, the primary prepreg was supplied between two resin [A] sheets, and pressurized and heated at 70° C. by using a roller, then the resultant was wound onto a roll to obtain a prepreg. The content of the resin composition to the whole prepreg was 35% by mass. Various performances of the obtained prepreg are shown in Table 12.

In Examples 36 to 40, into the epoxy resin composition [A] constituting the surface layer of the prepreg and the epoxy resin composition [B] constituting the inner layer of the prepreg, conductive particles were added. Into the epoxy resin composition [B], Dialead that is conductive particles having an average particle diameter of 10 μm or more and carbon black that is conductive particles having an average particle diameter of 5 μm or less were added.

The Dialead that is conductive particles having an average particle diameter of 10 μm or more hardly enters the reinforcing fiber layer in a process in which the reinforcing fiber layer is impregnated with an epoxy resin composition [B], and remained on the surface of the prepreg. On the other hand, carbon black that is conductive particles having an average particle diameter of 5 μm or less entered the reinforcing fiber layer and diffused.

As a result, in the prepregs obtained in Examples 36 to 40, conductive particles having an average particle diameter of 10 to 200 μm derived from the epoxy resin composition [B]

and conductive particles derived from the epoxy resin composition [A] were dispersed in the vicinity of the reinforcing fiber layer.

Further, in the prepregs of Examples 36 to 40, during the molding, conductive particles having a large particle diameter were dispersed between the reinforcing fiber layers that are adjacent to each other (between layers), on the other hand, conductive particles having a small particle diameter were also dispersed between the reinforcing fiber layers and in the reinforcing fiber layer. Consequently, conductive particles served as a conductive bridge respectively between the reinforcing fiber layers and in the reinforcing fiber layer of the FRP, and the conductivity of the FRP in the thickness direction could further be improved.

Further, a curing agent had not been contained in the inner layer of the prepreg, therefore, the handling property and storage stability at room temperature of the prepreg were favorable.

Example 41

In the proportions described in Table 12, 10 parts by mass of the epoxy resin-soluble thermoplastic resin (VW-10200RSFP) was dissolved into an epoxy resin at 120° C. by using a stirrer, and then the temperature was lowered to 80° C., a curing agent, the remained epoxy resin-soluble thermoplastic resin, an epoxy resin-insoluble thermoplastic resin, and conductive particles were added, and the resultant was mixed for 30 minutes to prepare an epoxy resin composition [A]. In the proportions described in Table 12, 10 parts by mass of the epoxy resin-soluble thermoplastic resin (VW-10200RSFP) was dissolved into an epoxy resin at 120° C. by using a stirrer, and then the temperature was lowered to 80° C., the remained epoxy resin-soluble thermoplastic resin, an epoxy resin-insoluble thermoplastic resin, and conductive particles were added, and the resultant was mixed for 30 minutes to prepare an epoxy resin composition [B]. A prepreg was produced in the same manner as in Example 36, and various performances of the obtained prepreg are shown in Table 12.

In Example 41, polyethersulfone having weight average molecular weight (Mw) of 40000 or more was used as an epoxy resin-soluble thermoplastic resin, therefore, each viscosity of the epoxy resin composition [A] and epoxy resin composition [B] obtained was increased.

TABLE 12

| Resin composition [parts by mass] | | | Example 36 | Example 37 | Example 38 | Example 39 | Example 40 | Example 41 |
|---|---|---|---|---|---|---|---|---|
| Epoxy resin composition A (surface layer) | Epoxy resin | MY0600 | | | | | | |
| | | MY0510 | | | | | | |
| | | ELM100 | | | | | | |
| | | MY721 | 100 | 100 | 100 | 100 | 100 | 100 |
| | | jER828 | | | | | | |
| | | jER154 | | | | | | |
| | Curing agent | 3,3-DDS | 140 | 140 | 140 | 140 | 140 | 140 |
| | | 4,4-DDS | | | | | | |
| | Thermoplastic resin | VW-10200RSFP | | | | | | 25 |
| | | VW-10700RSFP | | | | | | |
| | | VW-30500RP | 25 | 25 | 25 | 25 | 25 | |
| | | TR-55 | | | | | | |
| | Conductive particle | Carbon black | 1 | 2 | 2.5 | 3 | 3 | 1 |
| | | VGCF | | | | | | |
| | | Dialead GRANOC | | | | | | |
| Lowest resin viscosity [Poise] | | | 1000 | 1500 | 2000 | 3000 | 3000 | 3000 |
| Weight of resin A sheet on one side [g/m²] | | | 20.2 | 20.2 | 20.2 | 20.2 | 20.2 | 20.2 |
| Epoxy resin composition B (inner layer) | Epoxy resin | MY0600 | 100 | 100 | 100 | 100 | 100 | 100 |
| | | MY0510 | | | | | | |
| | | ELM100 | | | | | | |
| | | MY721 | | | | | | |
| | | jER828 | | | | | | |
| | | jER154 | | | | | | |
| | Curing agent | 3,3-DDS | | | | | | |
| | | 4,4-DDS | | | | | | |
| | Thermoplastic resin | VW-10200RSFP | | | | | | 35 |
| | | VW-10700RSFP | | | | | | |
| | | VW-30500RP | 35 | 35 | 35 | 35 | 35 | |
| | | TR-55 | 50 | 52 | 55 | 57 | 59 | 50 |
| | Conductive particle | Carbon black | 1.5 | 3 | 5 | 7 | 9 | 1.5 |
| | | VGCF | | | | | | |
| | | Dialead GRANOC | 1.5 | 3 | 5 | 7 | 9 | 1.5 |
| 80° C. resin viscosity [Poise] | | | 300 | 500 | 1000 | 2000 | 3000 | 3000 |
| Weight of resin B sheet on one side [g/m²] | | | 30 | 30 | 30 | 30 | 30 | 30 |
| Addition amount of conductive particles to the whole matrix resin [% by mass] | | | 1.1 | 2.2 | 3.4 | 4.5 | 5.6 | 1.1 |
| Performance of prepreg | | | | | | | | |
| Water absorption [%] | | | 5 | 5 | 5 | 7 | 9 | 9 |
| Storage stability at room temperature [○, Δ, X] | | | ○ | ○ | ○ | ○ | ○ | ○ |
| Tack retainability [○, Δ, X] | | | ○ | ○ | ○ | ○ | ○ | ○ |
| Draping property [○, Δ, X] | | | ○ | ○ | ○ | ○ | ○ | ○ |

TABLE 12-continued

| Resin composition [parts by mass] | Example 36 | Example 37 | Example 38 | Example 39 | Example 40 | Example 41 |
|---|---|---|---|---|---|---|
| Performance of CFRP | | | | | | |
| Volume resistivity [Ω · cm] | 100 | 50 | 20 | 10 | 5 | 100 |
| CAI (compression strength after impact) [MPa] | 350 | 330 | 315 | 310 | 300 | 350 |
| GIc (interlaminar fracture toughness mode I) [kJ/m$^2$] | 0.47 | 0.45 | 0.45 | 0.44 | 0.43 | 0.47 |
| GIIc (interlaminar fracture toughness mode II) [kJ/m$^2$] | 2.3 | 2.25 | 2.2 | 2.2 | 2.2 | 2.3 |

Examples 42 to 46

A prepreg was obtained in the same manner as in Example 36 except that the kinds of the conductive particles to be used for the epoxy resin compositions [A] and [B] were changed from carbon black to VGCF, and from Dialead to GRANOC, respectively, and the proportions were changed to the proportions described in Table 13.

As in the prepregs obtained in Examples 36 to 41, prepregs obtained in Examples 42 to 46 also had excellent conductivity.

Further, a curing agent was not contained in the inner layer of the prepreg, therefore, the handling property and storage stability at room temperature of the prepreg were favorable.

TABLE 13

| Resin composition [parts by mass] | | | Example 42 | Example 43 | Example 44 | Example 45 | Example 46 |
|---|---|---|---|---|---|---|---|
| Epoxy resin composition A (surface layer) | Epoxy resin | MY0600 | | | | | |
| | | MY0510 | | | | | |
| | | ELM100 | | | | | |
| | | MY721 | 50 | 50 | 50 | 50 | 50 |
| | | jER828 | 50 | 50 | 50 | 50 | 50 |
| | | jER154 | | | | | |
| | Curing agent | 3,3-DDS | 140 | 140 | 140 | 140 | 140 |
| | | 4,4-DDS | | | | | |
| | Thermoplastic resin | VW-10200RSFP | | | | | |
| | | VW-10700RSFP | 25 | 25 | 25 | 25 | 25 |
| | | VW-30500RP | | | | | |
| | | TR-55 | | | | | |
| | Conductive particle | Carbon black | | | | | |
| | | VGCF | 1 | 2 | 2.5 | 3 | 3 |
| | | Dialead | | | | | |
| | | GRANOC | | | | | |
| Lowest resin viscosity [Poise] | | | 1000 | 1500 | 2000 | 3000 | 3000 |
| Weight of resin A sheet on one side [g/m$^2$] | | | 20.2 | 20.2 | 20.2 | 20.2 | 20.2 |
| Epoxy resin composition B (inner layer) | Epoxy resin | MY0600 | | | | | |
| | | MY0510 | 100 | 100 | 100 | 100 | 50 |
| | | ELM100 | | | | | 50 |
| | | MY721 | | | | | |
| | | jER828 | | | | | |
| | | jER154 | | | | | |
| | Curing agent | 3,3-DDS | | | | | |
| | | 4,4-DDS | | | | | |
| | Thermoplastic resin | VW-10200RSFP | | | | | |
| | | VW-10700RSFP | 35 | 35 | 35 | 35 | 35 |
| | | VW-30500RP | | | | | |
| | | TR-55 | 50 | 52 | 55 | 57 | 59 |
| | Conductive particle | Carbon black | | | | | |
| | | VGCF | 1.5 | 3 | 5 | 7 | 9 |
| | | Dialead | | | | | |
| | | GRANOC | 1.5 | 3 | 5 | 7 | 9 |
| 80° C. resin viscosity [Poise] | | | 500 | 800 | 1300 | 2500 | 3000 |
| Weight of resin B sheet on one side [g/m$^2$] | | | 30 | 30 | 30 | 30 | 30 |
| Addition amount of conductive particles to the whole matrix resin [% by mass] | | | 1.1 | 2.2 | 3.4 | 4.5 | 5.6 |
| Performance of prepreg | | | | | | | |
| Water absorption [%] | | | 5 | 5 | 7 | 9 | 11 |
| Storage stability at room temperature [○, Δ, X] | | | ○ | ○ | ○ | ○ | ○ |
| Tack retainability [○, Δ, X] | | | ○ | ○ | ○ | ○ | ○ |
| Draping property [○, Δ, X] | | | ○ | ○ | ○ | ○ | ○ |
| Performance of CFRP | | | | | | | |
| Volume resistivity [Ω · cm] | | | 100 | 50 | 20 | 10 | 5 |
| CAI (compression strength after impact) [MPa] | | | 330 | 320 | 315 | 310 | 290 |
| GIc (interlaminar fracture toughness mode I) [kJ/m$^2$] | | | 0.44 | 0.43 | 0.42 | 0.40 | 0.38 |

TABLE 13-continued

| Resin composition [parts by mass] | Example 42 | Example 43 | Example 44 | Example 45 | Example 46 |
|---|---|---|---|---|---|
| GIIc (interlaminar fracture toughness mode II) [kJ/m$^2$] | 2.2 | 2.1 | 2.1 | 2.0 | 1.8 |

Example 47

In the proportions described in Table 14, conductive particles were added into an epoxy resin at 80° C., and the resultant was stirred for 30 minutes by using a stirrer to prepare an epoxy resin composition [A]. In the proportions described in Table 14, an epoxy resin-soluble thermoplastic resin was dissolved into an epoxy resin at 120° C. by using a stirrer, and then the temperature was lowered to 80° C., a curing agent, conductive particles, and an epoxy resin-insoluble thermoplastic resin were added, and the resultant was mixed for 30 minutes to prepare an epoxy resin composition [B].

The epoxy resin composition [A] and the epoxy resin composition [B] were respectively coated on a release sheet by using a film coater, and a resin [A] sheet and a resin [B] sheet, each of which has the weight described in Table 14, were obtained.

Next, the above-mentioned carbon fiber strand was supplied between two resin [B] sheets and uniformly arranged in one direction [weight (190 g/m$^2$)] to prepare the carbon fiber strand in a sheet shape, and then the resultant was pressurized and heated at 90° C. by using a roller to obtain a primary prepreg.

Next, the primary prepreg was supplied between two resin [A] sheets, and pressurized and heated at 70° C. by using a roller, then the resultant was wound onto a roll to obtain a prepreg. The content of the resin composition to the whole prepreg was 35% by mass. Various performances of the obtained prepreg are shown in Table 14.

In the prepreg obtained in Examples 47, the conductive coarse particles existed on the surface of the prepreg, and the conductive fine particles were dispersed in the reinforcing fiber layer. Therefore, the conductivity of the FRP prepared by the laminating and curing of the prepreg was sufficiently high. Further, the present prepreg was excellent in the storage stability. In the CFRP prepared from the present prepreg, excellent mechanical properties and conductivity in the thickness direction were provided.

TABLE 14

| Resin composition [parts by mass] | | | Example 47 |
|---|---|---|---|
| Epoxy resin composition A (surface layer) | Epoxy resin | MY0600 | 50 |
| | | ELM100 | 50 |
| | Thermoplastic resin | VW-10200RSFP | |
| | | VW-10700RSFP | |
| | | DAMS VW-30500RP | |
| | Conductive particle | Carbon black EC300J | |
| | | 20 nmAg | 3 |
| | | 100 nmAg | |
| | 80° C. resin viscosity [Poise] | | <10 |
| | Weight of resin A sheet on one side [g/m$^2$] | | 10.2 |
| Epoxy resin composition B (inner layer) | Epoxy resin | MY0600 | 15 |
| | | ELM100 | 15 |
| | | MY721 | 70 |
| | Curing agent | 3,3'-DDS | 65 |
| | Thermoplastic resin | VW-10200RSFP | |
| | | VW-10700RSFP | 20 |
| | | DAMS VW-30500RP | 14 |
| | | TR-55 | 50 |

TABLE 14-continued

| Resin composition [parts by mass] | Example 47 |
|---|---|
| Conductive particle    Dialead | |
| Flaky silver-coated copper powder | 0.75 |
| Carbon black EC300J | |
| 20 nmAg | 0.75 |
| 100 nmAg | |
| Lowest resin viscosity [Poise] | 300 |
| Weight of resin B sheet on one side [g/m$^2$] | 40 |
| Addition amount of conductive particles to the whole matrix resin [% by mass] | 1.07 |
| Performance of prepreg | |
| Water absorption [%] | 6 |
| Storage stability at room temperature [○, Δ, X] | ○ |
| Tack retainability [○, Δ, X] | ○ |
| Draping property [○, Δ, X] | ○ |
| Performance of CFRP | |
| Volume resistivity [Ω · cm] | 80 |
| CAI (compression strength after impact) [MPa] | 310 |
| GIc (interlaminar fracture toughness mode I) [kJ/m$^2$] | 0.345 |
| GIIc (interlaminar fracture toughness mode II) [kJ/m$^2$] | 2.0 |

Examples 48 to 57

In the proportions described in Table 15, an epoxy resin-soluble thermoplastic resin was dissolved into an epoxy resin at 120° C. by using a stirrer, and then the temperature was lowered to 80° C., conductive particles were added, and the resultant was stirred for 30 minutes to prepare an epoxy resin composition [A]. In the proportions described in Table 15, an epoxy resin-soluble thermoplastic resin (DAMS VW-30500RP) was dissolved into an epoxy resin at 120° C. by using a stirrer, and then the temperature was lowered to 80° C., the remained epoxy resin-soluble thermoplastic resin (VW-10700RSFP), an epoxy resin-insoluble thermoplastic resin, a curing agent, and conductive particles were added, and the resultant was mixed for 30 minutes to prepare an epoxy resin composition [B].

The epoxy resin composition [A] and the epoxy resin composition [B] were respectively coated on a release sheet by using a film coater, and a resin [A] sheet and a resin [B] sheet, each of which has the weight described in Table 15, were obtained.

Next, the above-mentioned carbon fiber strand was supplied between two resin [B] sheets and uniformly arranged in one direction [weight (190 g/m$^2$)] to prepare the carbon fiber strand in a sheet shape, and then the resultant was pressurized and heated at 130° C. by using a roller to obtain a primary prepreg.

Next, the primary prepreg was supplied between two resin [A] sheets, and pressurized and heated at 70° C. by using a roller, then the resultant was wound onto a roll to obtain a prepreg. The content of the resin composition to the whole prepreg was 35% by mass. Various performances of the obtained prepreg are shown in Table 15.

Further, a curing agent was not contained in the surface layers of the prepregs obtained in Examples 48 to 57, therefore, the handling property of the prepreg was excellent. In addition, the conductive coarse particles were localized in the surface layer of the prepreg, and the conductive fine particles were dispersed in the surface layer and reinforcing fiber layer. Consequently, in the CFRP prepared by using the obtained prepreg, conductive fine particles were dispersed in the reinforcing fiber layer of the CFRP, and further conductive coarse particles were localized between the reinforcing fiber layers. Therefore, the conductivity of the CFRP was sufficiently high. Further, the present prepreg was excellent in the storage stability. In the CFRP prepared from the present prepreg, excellent mechanical properties and conductivity in the thickness direction were provided.

Example 58

A prepreg was produced in the same manner as in Example 50 except that the conductive coarse particles were not mixed into the epoxy resin composition [B]. Various performances of the prepreg are shown in Table 15.

The prepreg obtained in Example 58 was excellent in the storage stability. Further, in the CFRP prepared by using the prepreg, the mechanical properties were excellent, however, conductive coarse particles did not exist between the reinforcing fiber layers (resin layer) of the CFRP, therefore, the formation of the conductive bridge was slightly insufficient. Therefore, the value of the conductivity of the CFRP was lower than that in Example 4, however, the value was a value with which the CFRP can sufficiently withstand practical use.

Comparative Example 16

A prepreg was produced in the same manner as in Example 48 except that the conductive particles were not added into the epoxy resin compositions [A] and [B]. Various performances of the prepreg are shown in Table 15.

The prepreg obtained in Comparative Example 16 was excellent in the storage stability. Further, in the CFRP prepared by using the prepreg, the mechanical properties were excellent, however, the value of the conductivity was low because conductive particles had not been added.

Comparative Example 17

A prepreg was produced in the same manner as in Example 48 except that the conductive particles were not added into the epoxy resin composition [A]. Various performances of the prepreg are shown in Table 15.

The prepreg obtained in Comparative Example 17 was excellent in the storage stability. Further, in the CFRP prepared by using the prepreg, the mechanical properties were excellent, however, the value of the conductivity was low because conductive particles had not been added into the epoxy resin composition [A].

TABLE 15

| | | | Example 48 | Example 49 | Example 50 | Example 51 | Example 52 | Example 53 | Example 54 | Example 55 | Example 56 | Example 57 | Example 58 |
|---|---|---|---|---|---|---|---|---|---|---|---|---|---|
| Epoxy resin composition A (surface layer) | Epoxy resin | MY0600 | 50 | 50 | 50 | 50 | 50 | 50 | 50 | 50 | 50 | 50 | 50 |
| | | ELM100 | 50 | 50 | 50 | 50 | 50 | 50 | 50 | 50 | 50 | 50 | 50 |
| | Thermoplastic resin | VW-10200RSFP | 30 | 30 | 30 | 30 | 30 | 30 | 30 | 30 | 30 | 30 | 30 |
| | | VW-10700RSFP | | | | | | | | | | | |
| | Conductive particle | DAMS VW-30500RP | | | | | | | | | | | |
| | | Carbon black EC300J | 3 | | | | | | | | | | |
| | | 20 nmAg | | | | 6.5 | | | | | 6.5 | 6.5 | |
| | | 100 nmAg | | 6.5 | 6.5 | | 6.5 | 6.5 | 6.5 | 14 | | | 6.5 |
| | 80° C. resin viscosity [Poise] | | 400 | 1500 | 1500 | 1500 | 2500 | 2500 | 2500 | 3000 | 1200 | 700 | 1500 |
| | Weight of resin A sheet on one side [g/m²] | | 10.2 | 10.2 | 10.2 | 10.2 | 10.2 | 10.2 | 10.2 | 10.2 | 10.2 | 10.2 | 10.2 |
| Epoxy resin composition B (inner layer) | Epoxy resin | MY0600 | 15 | 15 | 15 | 15 | 15 | 15 | 15 | 15 | 15 | 15 | 15 |
| | | ELM100 | 15 | 15 | 15 | 15 | 15 | 15 | 15 | 15 | 15 | 15 | 15 |
| | | MV721 | 70 | 70 | 70 | 70 | 70 | 70 | 70 | 70 | 70 | 70 | 70 |
| | Curing agent | 3,3′-DDS | 65 | 65 | 65 | 65 | 65 | 65 | 65 | 65 | 65 | 65 | 65 |
| | Thermoplastic resin | VW-10200RSFP | 20 | 20 | 20 | 20 | 20 | 20 | 20 | 20 | 20 | 20 | 20 |
| | | VW-10700RSFP | 14 | 14 | 14 | 14 | 14 | 14 | 14 | 14 | 14 | 14 | 14 |
| | | DAMS VW-30500RP | 50 | 50 | 50 | 50 | 50 | 50 | 50 | 50 | 50 | 50 | 50 |
| | | TR-55 | | | | | | | | | | | |
| | Thermoplastic resin | Dialead | 0.75 | 1.5 | 3 | 4.7 | 1.5 | 3 | 4.7 | 3 | 4.5 | 3 | |
| | | Flaky silver-coated copper powder | 0.75 | | | | | | | | | | |
| | | Carbon black EC300J | | 1.5 | 3 | 4.7 | 1.5 | 3 | 4.7 | 3 | 1.5 | 3 | 3 |
| | | 20 nmAg | | | | | | | | | | | |
| | | 100 nmAg | 300 | 500 | 700 | 1000 | 700 | 1000 | 1500 | 700 | 650 | 900 | 600 |
| | Lowest resin viscosity [Poise] | | 40 | 40 | 40 | 40 | 40 | 40 | 40 | 40 | 40 | 40 | 40 |
| | Weight of resin B sheet on one side [g/m²] | | 0.94 | 1.92 | 2.84 | 3.87 | 1.92 | 2.84 | 3.87 | 3.85 | 2.84 | 2.84 | 1.92 |
| Addition amount of conductive particles to the whole matrix resin [% by mass] | | | | | | | | | | | | | |
| Performance of prepreg | | | | | | | | | | | | | | |
| Water absorption [%] | | | 6 | 8 | 10 | 10 | 8 | 12 | 12 | 8 | 6 | 6 | 6 |
| Storage stability at room temperature [○, △, X] | | | ○ | ○ | ○ | ○ | ○ | ○ | ○ | ○ | ○ | ○ | ○ |
| Tack retainability [○, △, X] | | | ○ | ○ | ○ | ○ | ○ | △ | △ | ○ | ○ | ○ | ○ |
| Draping property [○, △, X] | | | ○ | ○ | ○ | ○ | ○ | ○ | ○ | ○ | ○ | ○ | ○ |
| Performance of CFRP | | | | | | | | | | | | | | |
| Volume resistivity [Ω · cm] | | | 60 | 30 | 10 | 1 | 80 | 50 | 15 | 2 | 3 | 4 | 80 |
| CAI (compression strength after impact) [MPa] | | | 310 | 300 | 300 | 290 | 310 | 300 | 290 | 290 | 300 | 300 | 310 |
| GIc (interlaminar fracture toughness mode I) [kJ/m²] | | | 0.345 | 0.34 | 0.34 | 0.32 | 0.34 | 0.34 | 0.32 | 0.34 | 0.34 | 0.34 | 0.34 |
| GIIc (interlaminar fracture toughness mode II) [kJ/m²] | | | 2.0 | 1.9 | 1.9 | 1.8 | 2.0 | 1.9 | 1.8 | 1.8 | 1.9 | 1.9 | 1.7 |

TABLE 16

(Continuation of Table 15)

| Resin composition [parts by mass] | | | Comp. Ex. 16 | Comp. Ex. 17 |
|---|---|---|---|---|
| Epoxy resin composition A (surface layer) | Epoxy resin | MY0600 | 50 | 50 |
| | | ELM100 | 50 | 50 |
| | Thermoplastic resin | VW-10200RSFP | | |
| | | VW-10700RSFP | 30 | 30 |
| | | DAMS VW-30500RP | | |
| | Conductive particle | Carbon black EC300J | | |
| | | 20 nmAg | | |
| | | 100 nmAg | | |
| | 80° C. resin viscosity [Poise] | | 300 | 300 |
| | Weight of resin A sheet on one side [g/m$^2$] | | 10.2 | 10.2 |
| Epoxy resin composition B (inner layer) | Epoxy resin | MY0600 | 15 | 15 |
| | | ELM100 | 15 | 15 |
| | | MY721 | 70 | 70 |
| | Curing agent | 3,3'-DDS | 65 | 65 |
| | Thermoplastic resin | VW-10200RSFP | | |
| | | VW-10700RSFP | 20 | 20 |
| | | DAMS VW-30500RP | 14 | 14 |
| | | TR-55 | 50 | 50 |
| | Conductive particle | Dialead | | 3 |
| | | Flaky silver-coated copper powder | | |
| | | Carbon black EC300J | | 3 |
| | | 20 nmAg | | |
| | | 100 nmAg | | |
| | Lowest resin viscosity [Poise] | | 100 | 500 |
| | Weight of resin B sheet on one side [g/m$^2$] | | 40 | 40 |
| Addition amount of conductive particles to the whole matrix resin [% by mass] | | | 0 | 1.87 |
| Performance of prepreg | | | | |
| Water absorption [%] | | | 5 | 6 |
| Storage stability at room temperature [○, Δ, X] | | | ○ | ○ |
| Tack retainability [○, Δ, X] | | | ○ | ○ |
| Draping property [○, Δ, X] | | | ○ | ○ |
| Performance of CFRP | | | | |
| Volume resistivity [Ω·cm] | | | 4000 | 100 |
| CAI (compression strength after impact) [MPa] | | | 340 | 320 |
| GIc (interlaminar fracture toughness mode I) [kJ/m$^2$] | | | 0.43 | 0.34 |
| GIIc (interlaminar fracture toughness mode II) [kJ/m$^2$] | | | 2.2 | 1.6 |

REFERENCE SIGNS LIST

100 . . . Prepreg
10 . . . Primary prepreg
11 . . . Reinforcing fiber
12, 21, 36, 38 . . . Reinforcing fiber layer
13 . . . Epoxy resin composition [B]
13a, 13b . . . Resin [B] sheet
14a, 14b . . . Release paper
15 . . . Epoxy resin composition [A]
15a, 15b . . . Resin [A] sheet
40 . . . Resin layer
34 . . . Conductive coarse particle
21 . . . Reinforcing fiber layer
23a, 23b . . . Roll of resin [A] sheet
24a, 24b . . . Winding roll of release paper
25a, 25b . . . Roll of resin [B] sheet
27a, 27b, 29a, 29b . . . Hot roller
101 . . . Winding roll of prepreg
A . . . Arrow indicating the running direction of reinforcing fiber sheet
Z . . . Arrow indicating the thickness direction of reinforcing fiber sheet

The invention claimed is:

1. A prepreg comprising:
a primary prepreg composed of a reinforcing fiber, and a resin composition (I) with which a reinforcing fiber layer formed from the reinforcing fiber has been impregnated; and
a surface layer composed of a resin composition (II) formed on one side or both sides of the primary prepreg,
wherein the resin composition (I) is an epoxy resin composition [B] having a lowest viscosity of 100 to 1500 poise, containing at least an epoxy resin and a thermoplastic resin, and wherein
the resin composition (II) is an epoxy resin composition [A] containing at least an epoxy resin and 0.2 to 19.9 parts by mass of a conductive particle based on 100 parts by mass of the epoxy resin contained in the epoxy resin composition [A], wherein a value of 50% particle diameter ($D_{50}$) in the particle size distribution measured of the conductive particle is 20 to 300 nm by using a laser diffraction scattering method, and 15 to 40 parts by mass of a thermoplastic resin based on 100 parts by mass of the epoxy resin contained in the epoxy resin composition [A],
and wherein
the resin composition (I) and the resin composition (II) are not the same composition, and
the viscosity at 80° C. of the resin composition (II) is 100 to 5000 poise.

2. The prepreg according to claim 1,
wherein a mass ratio of the epoxy resin contained in the epoxy resin composition [A] to the epoxy resin contained in the epoxy resin composition [B] is 1:1 to 1:9.

3. The prepreg according to claim 1,
wherein the thermoplastic resin contained in the epoxy resin composition [B] is an epoxy resin soluble thermoplastic resin.

4. The prepreg according to claim 1,
wherein the thermoplastic resin contained in the epoxy resin composition [B] is an epoxy resin-soluble thermoplastic resin and an epoxy resin-insoluble thermoplastic resin.

5. The prepreg according to claim 3,
wherein the epoxy resin-soluble thermoplastic resin is at least one kind selected from polyethersulfone, polyetherimide, polycarbonate, and polysulfone.

6. The prepreg according to claim 4,
wherein the epoxy resin-insoluble thermoplastic resin is at least one kind selected from amorphous nylon, nylon 6, nylon 12, and amorphous polyimide.

7. The prepreg according to claim 3,
wherein a weight average molecular weight (Mw) of the epoxy resin-soluble thermoplastic resin is 8000 to 40000.

8. The prepreg according to claim 1,
wherein the epoxy resin composition [B] further contains 0.2 to 20 parts by mass of conductive particle based on 100 parts by mass of the epoxy resin contained in the epoxy resin composition [B].

9. The prepreg according to claim 8,
wherein the conductive particle contained in the epoxy resin composition [B] is a conductive particle having an average particle diameter of 10 to 200 μm by a laser diffraction method.

10. The prepreg according to claim 1,
wherein at least one of the epoxy resin composition [A] and the epoxy resin composition [B] contains a curing agent.

11. The prepreg according to claim 1,
wherein the epoxy resin composition [B] is an epoxy resin composition containing no curing agent for an epoxy resin, and
the epoxy resin composition [A] is an epoxy resin composition containing a curing agent for an epoxy resin.

12. The prepreg according to claim 1,
wherein the conductive particle is at least one kind selected from a carbon particle, a metal particle, a coated conductive particle, and a carbon fiber particle.

13. The prepreg according to claim 12,
wherein the carbon particle is at least one kind selected from a carbon black, a carbon nanotube, a carbon nanofiber, an expanded graphite, a flaky graphite, a graphite powder, a graphite particle, a graphene sheet, and a carbon milled fiber.

14. The prepreg according to claim 1,
wherein the reinforcing fiber is a carbon fiber.

15. The prepreg according to claim 1,
wherein the epoxy resin contained in the epoxy resin composition [A] and/or the epoxy resin composition [B] is an epoxy resin having a glycidyl amine structure.

* * * * *